US008055899B2

(12) United States Patent
Levy et al.

(10) Patent No.: US 8,055,899 B2
(45) Date of Patent: Nov. 8, 2011

(54) SYSTEMS AND METHODS USING DIGITAL WATERMARKING AND IDENTIFIER EXTRACTION TO PROVIDE PROMOTIONAL OPPORTUNITIES

(75) Inventors: Kenneth L. Levy, Stevenson, WA (US); Joel R. Meyer, Lake Oswego, OR (US); Hoyet Harrison Andrews, III, San Antonio, TX (US)

(73) Assignee: Digimarc Corporation, Beaverton, OR (US)

( * ) Notice: Subject to any disclaimer, the term of this patent is extended or adjusted under 35 U.S.C. 154(b) by 1254 days.

(21) Appl. No.: 11/208,441

(22) Filed: Aug. 19, 2005

(65) Prior Publication Data
US 2006/0062426 A1 Mar. 23, 2006

Related U.S. Application Data

(63) Continuation-in-part of application No. 10/126,921, filed on Apr. 18, 2002, now Pat. No. 7,266,704, which is a continuation-in-part of application No. 10/017,679, filed on Dec. 13, 2001, now abandoned.

(60) Provisional application No. 60/256,628, filed on Dec. 18, 2000, provisional application No. 60/336,209, filed on Oct. 30, 2001, provisional application No. 60/285,514, filed on Apr. 20, 2001, provisional application No. 60/315,569, filed on Aug. 28, 2001.

(51) Int. Cl.
*H04L 29/06* (2006.01)
*G06F 21/00* (2006.01)
(52) U.S. Cl. .......................... 713/176; 705/57
(58) Field of Classification Search .................. 713/176; 705/57
See application file for complete search history.

(56) References Cited

U.S. PATENT DOCUMENTS 3,919,479 A 11/1975 Moon et al.
3,984,624 A 10/1976 Waggener
4,025,851 A 5/1977 Haselwood et al.
4,218,738 A 8/1980 Matyas et al.
(Continued)

FOREIGN PATENT DOCUMENTS
DE 3806414 A1 9/1989
(Continued)

OTHER PUBLICATIONS

Blackburn, "A Tool for Content Based Navigation of Music," ACM Multimedia 98.

(Continued)

*Primary Examiner* — Techane Gergiso

(57) ABSTRACT

The present disclosure relates to processing media content (e.g., video or audio signals). One claim recites a method including: receiving first content comprising a video portion or an audio portion, the first content being received over a network from a user; utilizing a multi-purpose electronic processor programmed as a content identifier module, deriving identifying data from data representing picture portions of the video portion or from data representing audible portions of the audio portion of the first content; with reference to a computerized database or computerized repository, determining a first promotional opportunity associated with the identifying data, in which the first proportional opportunity comprises an opportunity to purchase second content, the second content being related to—but different than—the first content, and determining a second, different promotional opportunity associated with the identifying data if another instance of the identifying data is thereafter received; and providing information regarding the first promotional opportunity or the second, different promotional opportunity. Of course, other claims and combinations are provided too.

17 Claims, 20 Drawing Sheets

U.S. PATENT DOCUMENTS

| | | |
|---|---|---|
| 4,230,990 A | 10/1980 | Lert, Jr. et al. |
| 4,333,113 A | 6/1982 | Kalinowski |
| 4,450,531 A | 5/1984 | Kenyon et al. |
| 4,528,588 A | 7/1985 | Lofberg |
| 4,528,643 A | 7/1985 | Freeny |
| 4,805,020 A | 2/1989 | Greenberg |
| 4,807,031 A | 2/1989 | Broughton et al. |
| 4,827,508 A | 5/1989 | Shear |
| 4,888,798 A | 12/1989 | Earnest |
| 4,931,871 A | 6/1990 | Kramer |
| 4,941,175 A | 7/1990 | Enescu et al. |
| 4,945,412 A | 7/1990 | Kramer |
| 4,969,041 A | 11/1990 | O'Grady et al. |
| 4,972,471 A | 11/1990 | Gross et al. |
| 4,977,594 A | 12/1990 | Shear |
| 4,979,210 A | 12/1990 | Nagata et al. |
| 4,999,806 A | 3/1991 | Chernow et al. |
| 5,023,907 A | 6/1991 | Johnson et al. |
| 5,050,213 A | 9/1991 | Shear |
| 5,073,925 A | 12/1991 | Nagata et al. |
| 5,077,608 A | 12/1991 | Dubner |
| 5,079,648 A | 1/1992 | Maufe |
| 5,103,476 A | 4/1992 | Waite |
| 5,113,437 A | 5/1992 | Best et al. |
| 5,113,518 A | 5/1992 | Durst et al. |
| 5,138,712 A | 8/1992 | Corbin |
| 5,161,210 A | 11/1992 | Druyvesteyn et al. |
| 5,182,770 A | 1/1993 | Medveczky et al. |
| 5,319,453 A | 6/1994 | Copriviza et al. |
| 5,319,705 A | 6/1994 | Halter |
| 5,319,735 A | 6/1994 | Preuss et al. |
| 5,321,841 A | 6/1994 | East |
| 5,379,345 A | 1/1995 | Greenberg |
| 5,410,598 A | 4/1995 | Shear |
| 5,418,853 A | 5/1995 | Kanota et al. |
| 5,428,606 A | 6/1995 | Moskowitz |
| 5,428,731 A | 6/1995 | Powers, III |
| 5,450,490 A | 9/1995 | Jensen et al. |
| 5,464,997 A | 11/1995 | Watanabe |
| 5,473,692 A | 12/1995 | Davis |
| 5,481,294 A | 1/1996 | Thomas et al. |
| 5,495,411 A | 2/1996 | Ananda |
| 5,519,778 A | 5/1996 | Leighton et al. |
| 5,548,645 A | 8/1996 | Ananda |
| 5,553,143 A | 9/1996 | Ross et al. |
| 5,574,962 A | 11/1996 | Fardeau et al. |
| 5,579,124 A | 11/1996 | Aijala et al. |
| 5,579,479 A | 11/1996 | Plum |
| 5,581,800 A | 12/1996 | Fardeau et al. |
| 5,606,609 A | 2/1997 | Houser et al. |
| 5,613,004 A | 3/1997 | Cooperman et al. |
| 5,617,119 A | 4/1997 | Briggs et al. |
| 5,629,980 A | 5/1997 | Stefik et al. |
| 5,634,012 A | 5/1997 | Stefik et al. |
| 5,636,276 A | 6/1997 | Brugger |
| 5,638,443 A | 6/1997 | Stefik et al. |
| 5,640,193 A | 6/1997 | Wellner |
| 5,646,997 A | 7/1997 | Barton |
| 5,646,999 A | 7/1997 | Saito |
| 5,652,714 A | 7/1997 | Peterson et al. |
| 5,657,462 A | 8/1997 | Brouwer et al. |
| 5,699,526 A | 12/1997 | Siefert |
| 5,715,403 A | 2/1998 | Stefik |
| 5,734,119 A | 3/1998 | France et al. |
| 5,734,719 A | 3/1998 | Tseydos |
| 5,745,569 A | 4/1998 | Moskowitz et al. |
| 5,748,956 A | 5/1998 | Lafer |
| 5,765,152 A | 6/1998 | Erickson |
| 5,765,176 A | 6/1998 | Bloomberg et al. |
| 5,774,452 A | 6/1998 | Wolosewicz |
| 5,801,687 A | 9/1998 | Peterson et al. |
| 5,809,160 A | 9/1998 | Powell et al. |
| 5,822,432 A | 10/1998 | Moskowitz et al. |
| 5,822,436 A | 10/1998 | Rhoads |
| 5,828,485 A | 10/1998 | Hewlett |
| 5,832,119 A | 11/1998 | Rhoads |
| 5,838,458 A | 11/1998 | Tsai |
| 5,841,978 A | 11/1998 | Rhoads |
| 5,845,281 A | 12/1998 | Benson et al. |
| 5,848,424 A | 12/1998 | Scheinkman et al. |
| 5,850,481 A | 12/1998 | Rhoads |
| 5,852,673 A | 12/1998 | Young |
| 5,862,260 A | 1/1999 | Rhoads |
| 5,892,900 A | 4/1999 | Ginter et al. |
| 5,893,218 A | 4/1999 | Hunter et al. |
| 5,905,800 A | 5/1999 | Moskowitz et al. |
| 5,907,837 A | 5/1999 | Ferrel et al. |
| 5,915,019 A | 6/1999 | Ginter et al. |
| 5,917,912 A | 6/1999 | Ginter et al. |
| 5,920,861 A | 7/1999 | Hall et al. |
| 5,920,878 A | 7/1999 | DeMont |
| 5,926,822 A | 7/1999 | Garman |
| 5,940,504 A | 8/1999 | Griswold |
| 5,943,422 A | 8/1999 | Van Wie et al. |
| 5,956,716 A | 9/1999 | Kenner et al. |
| 5,963,957 A | 10/1999 | Hoffberg |
| 5,974,141 A | 10/1999 | Saito |
| 5,983,218 A | 11/1999 | Syeda-Mahmood |
| 5,991,876 A | 11/1999 | Johnson et al. |
| 5,995,625 A | 11/1999 | Sudia |
| 6,005,858 A | 12/1999 | Fallon et al. |
| 6,006,332 A | 12/1999 | Rabne et al. |
| 6,121,530 A | 9/2000 | Sonoda |
| 6,122,403 A | 9/2000 | Rhoads |
| 6,135,646 A | 10/2000 | Kahn et al. |
| 6,141,753 A | 10/2000 | Zhao et al. |
| 6,157,721 A | 12/2000 | Shear et al. |
| 6,185,683 B1 | 2/2001 | Ginter et al. |
| 6,188,010 B1 | 2/2001 | Iwamura |
| 6,226,618 B1 | 5/2001 | Downs et al. |
| 6,233,684 B1 | 5/2001 | Stefik |
| 6,236,971 B1 | 5/2001 | Stefik |
| 6,285,776 B1 | 9/2001 | Rhoads |
| 6,301,660 B1 | 10/2001 | Benson |
| 6,330,335 B1 | 12/2001 | Rhoads |
| 6,330,670 B1 | 12/2001 | England |
| 6,363,488 B1 | 3/2002 | Ginter |
| 6,398,245 B1 | 6/2002 | Gruse |
| 6,411,725 B1 | 6/2002 | Rhoads |
| 6,442,285 B2 | 8/2002 | Rhoads et al. |
| 6,449,367 B2 | 9/2002 | Van Wie et al. |
| 6,505,160 B1 | 1/2003 | Levy et al. |
| 6,519,352 B2 | 2/2003 | Rhoads |
| 6,522,769 B1 | 2/2003 | Rhoads |
| 6,542,927 B2 | 4/2003 | Rhoads |
| 6,574,609 B1 | 6/2003 | Downs et al. |
| 6,614,914 B1 | 9/2003 | Rhoads |
| 6,618,484 B1 | 9/2003 | Van Wie et al. |
| 6,664,976 B2 | 12/2003 | Lofgren et al. |
| 6,768,808 B2 | 7/2004 | Rhoads |
| 6,782,191 B1 | 8/2004 | Ikeda et al. |
| 6,785,815 B1 | 8/2004 | Serret-Avila et al. |
| 6,786,397 B2 | 9/2004 | Silverbrook et al. |
| 6,807,534 B1 | 10/2004 | Erickson |
| 6,816,596 B1 | 11/2004 | Peinado et al. |
| 6,829,368 B2 | 12/2004 | Meyer et al. |
| 6,836,844 B1 | 12/2004 | Kori et al. |
| 6,850,252 B1 | 2/2005 | Hoffberg |
| 6,856,977 B1 | 2/2005 | Adelsbach et al. |
| 6,868,497 B1 | 3/2005 | Levy |
| 6,882,728 B1 | 4/2005 | Takahashi et al. |
| 6,898,706 B1 | 5/2005 | Venkatesan et al. |
| 6,931,451 B1 | 8/2005 | Logan et al. |
| 6,941,275 B1 | 9/2005 | Swierczek |
| 6,947,571 B1 | 9/2005 | Rhoads et al. |
| 6,954,856 B1 | 10/2005 | Kohashi et al. |
| 6,968,337 B2 | 11/2005 | Wold |
| 6,968,455 B2 | 11/2005 | Okayasu |
| 7,035,427 B2 | 4/2006 | Rhoads |
| 7,043,050 B2 | 5/2006 | Yuval |
| 7,047,241 B1 | 5/2006 | Erickson |
| 7,058,697 B2 | 6/2006 | Rhoads |
| 7,061,510 B2 | 6/2006 | Rhoads |
| 7,062,069 B2 | 6/2006 | Rhoads |
| 7,149,722 B1 | 12/2006 | Abburi |
| 7,174,293 B2 | 2/2007 | Kenyon et al. |
| 7,248,717 B2 | 7/2007 | Rhoads |

| | | |
|---|---|---|
| 7,251,475 B2 | 7/2007 | Kawamoto |
| 7,266,704 B2 | 9/2007 | Levy |
| 7,289,643 B2 | 10/2007 | Brunk et al. |
| 7,302,574 B2 | 11/2007 | Conwell et al. |
| 7,313,251 B2 | 12/2007 | Rhoads |
| 7,349,552 B2 | 3/2008 | Levy et al. |
| 7,372,976 B2 | 5/2008 | Rhoads et al. |
| 7,382,879 B1* | 6/2008 | Miller .......................... 380/201 |
| 7,415,129 B2 | 8/2008 | Rhoads |
| 7,426,750 B2 | 9/2008 | Cooper et al. |
| 7,461,136 B2 | 12/2008 | Rhoads |
| 7,487,363 B2 | 2/2009 | Alve et al. |
| 7,499,566 B2 | 3/2009 | Rhoads |
| 7,543,148 B1 | 6/2009 | Kirovski et al. |
| 7,587,601 B2 | 9/2009 | Levy et al. |
| 7,587,602 B2 | 9/2009 | Rhoads |
| 7,590,259 B2 | 9/2009 | Levy et al. |
| 7,650,009 B2 | 1/2010 | Rhoads |
| 7,650,010 B2 | 1/2010 | Levy et al. |
| 7,689,532 B1 | 3/2010 | Levy |
| 7,787,653 B2 | 8/2010 | Rhoads |
| 7,822,969 B2 | 10/2010 | Anglin |
| 2001/0004736 A1 | 6/2001 | Hirano |
| 2001/0008557 A1 | 7/2001 | Stefik |
| 2001/0021144 A1 | 9/2001 | Oshima et al. |
| 2001/0026618 A1 | 10/2001 | Van Wie et al. |
| 2001/0031066 A1* | 10/2001 | Meyer et al. .................. 382/100 |
| 2001/0032312 A1 | 10/2001 | Runje et al. |
| 2001/0037378 A1 | 11/2001 | Hirayama |
| 2001/0042043 A1 | 11/2001 | Shear |
| 2002/0002468 A1 | 1/2002 | Spagna |
| 2002/0007456 A1 | 1/2002 | Peinado |
| 2002/0013772 A1 | 1/2002 | Peinado |
| 2002/0017557 A1 | 2/2002 | Hendrick |
| 2002/0019814 A1 | 2/2002 | Ganesan |
| 2002/0019946 A1 | 2/2002 | Iwamura |
| 2002/0026362 A1 | 2/2002 | Tanaka |
| 2002/0048369 A1 | 4/2002 | Ginter |
| 2002/0059238 A1 | 5/2002 | Saito |
| 2002/0062252 A1 | 5/2002 | Van Zoest |
| 2002/0064759 A1 | 5/2002 | Durbin et al. |
| 2002/0065780 A1 | 5/2002 | Barritz |
| 2002/0069218 A1 | 6/2002 | Sull et al. |
| 2002/0080969 A1 | 6/2002 | Giobbi |
| 2002/0082922 A1 | 6/2002 | Van Zoest |
| 2002/0082997 A1* | 6/2002 | Kobata et al. .................... 705/51 |
| 2002/0083005 A1 | 6/2002 | Lowenstein |
| 2002/0091584 A1* | 7/2002 | Clark et al. ...................... 705/26 |
| 2002/0095601 A1 | 7/2002 | Hind et al. |
| 2002/0106082 A1 | 8/2002 | Kori et al. |
| 2002/0107691 A1 | 8/2002 | Korovski et al. |
| 2002/0107803 A1 | 8/2002 | Lisanke et al. |
| 2002/0108050 A1 | 8/2002 | Raley et al. |
| 2002/0111878 A1 | 8/2002 | Namba |
| 2002/0112163 A1 | 8/2002 | Ireton |
| 2002/0112171 A1 | 8/2002 | Ginter |
| 2002/0114458 A1 | 8/2002 | Belenko |
| 2002/0114466 A1 | 8/2002 | Tanaka |
| 2002/0120515 A1 | 8/2002 | Morimoto |
| 2002/0124050 A1 | 9/2002 | Middeljans |
| 2002/0136405 A1 | 9/2002 | Hori |
| 2002/0141582 A1 | 10/2002 | Kocher |
| 2002/0141584 A1 | 10/2002 | Razdan |
| 2002/0144130 A1 | 10/2002 | Rosner |
| 2002/0164047 A1 | 11/2002 | Yuval |
| 2002/0165793 A1 | 11/2002 | Brand |
| 2002/0186844 A1 | 12/2002 | Levy et al. |
| 2002/0194492 A1 | 12/2002 | Choi et al. |
| 2003/0005135 A1 | 1/2003 | Inoue et al. |
| 2003/0012403 A1 | 1/2003 | Rhoads et al. |
| 2003/0026421 A1 | 2/2003 | Morlet |
| 2003/0028488 A1 | 2/2003 | Mohammed et al. |
| 2003/0034771 A1 | 2/2003 | Sharman |
| 2003/0056103 A1 | 3/2003 | Levy et al. |
| 2003/0061165 A1 | 3/2003 | Okamoto et al. |
| 2003/0069853 A1 | 4/2003 | Bryant |
| 2003/0076955 A1 | 4/2003 | Alve et al. |
| 2003/0077065 A1 | 4/2003 | Scholten |
| 2003/0078889 A1 | 4/2003 | Lee |
| 2003/0078891 A1* | 4/2003 | Capitant ............................ 705/57 |
| 2003/0084306 A1* | 5/2003 | Abburi et al. .................. 713/188 |
| 2003/0126086 A1* | 7/2003 | Safadi ............................. 705/51 |
| 2003/0159043 A1 | 8/2003 | Epstein |
| 2003/0167173 A1* | 9/2003 | Levy et al. ..................... 704/273 |
| 2003/0221164 A1 | 11/2003 | Williams et al. |
| 2004/0005093 A1 | 1/2004 | Rhoads |
| 2004/0059933 A1 | 3/2004 | Levy |
| 2004/0081110 A1* | 4/2004 | Koskimies ...................... 370/315 |
| 2004/0107356 A1* | 6/2004 | Shamoon et al. .............. 713/193 |
| 2004/0148408 A1 | 7/2004 | Nadarajah |
| 2004/0243634 A1 | 12/2004 | Levy |
| 2005/0018873 A1 | 1/2005 | Rhoads |
| 2005/0065890 A1 | 3/2005 | Benaloh |
| 2005/0066187 A1 | 3/2005 | Peinado |
| 2005/0091268 A1* | 4/2005 | Meyer et al. ............... 707/103 R |
| 2005/0097359 A1 | 5/2005 | Speare et al. |
| 2005/0216454 A1 | 9/2005 | Diab et al. |
| 2005/0278787 A1* | 12/2005 | Naslund et al. .................. 726/26 |
| 2006/0014523 A1* | 1/2006 | Reilly .......................... 455/412.1 |
| 2006/0026691 A1* | 2/2006 | Kim et al. ........................ 726/27 |
| 2006/0062426 A1 | 3/2006 | Levy et al. |
| 2006/0095382 A1* | 5/2006 | Mahlbacher ..................... 705/59 |
| 2006/0265441 A1* | 11/2006 | Andersson et al. ............ 708/200 |
| 2007/0124602 A1* | 5/2007 | Wald et al. ..................... 713/193 |
| 2007/0156726 A1 | 7/2007 | Levy |
| 2007/0192352 A1 | 8/2007 | Levy |
| 2007/0208711 A1 | 9/2007 | Rhoads et al. |
| 2007/0294173 A1 | 12/2007 | Levy et al. |
| 2008/0097919 A1* | 4/2008 | Szucs .............................. 705/52 |
| 2008/0140433 A1 | 6/2008 | Levy et al. |
| 2008/0270575 A1 | 10/2008 | Rodriguez |

FOREIGN PATENT DOCUMENTS

| | | |
|---|---|---|
| EP | 0618723 | 10/1994 |
| WO | WO96/31049 | 10/1996 |
| WO | WO9904568 | 1/1999 |
| WO | WO0211123 | 2/2002 |
| WO | WO02/19589 | 3/2002 |
| WO | WO02/37489 | 5/2002 |
| WO | WO02/086802 | 10/2002 |
| WO | WO02/086803 | 10/2002 |

OTHER PUBLICATIONS

Cano et al. "A Review of Audio Fingerprinting," Journal of VLSI Signal Processing. 41, 271-284, 2005.

Foote, "An Overview of Audio Information Retrieval," Multimedia Systems, v.7 n.1, p. 2-10, Jan. 1999.

Ghias et al, Query by Humming: Musical Information Retrieval in an Audio Database. In ACM Multimedia, pp. 231-236, Nov. 1995.

Haitsma et al, "Robust Audio Hashing for Content Identification." International Workshop on Content-Based Multimedia Indexing, Sep. 19, 2001.

Haitsma et al, "A Highly Robust Audio Fingerprinting System," Proc. Intl Conf on Music Information Retrieval, Oct. 13, 2002.

P.C.J. Hill, "Simultaneous Subliminal Signalling in Conventional Sound Circuits," BBC Engineering, No. 90, pp. 14-31, 1972.

Namba et al., "A Program Identification Code Transmission System Using Low-Frequency Audio Signals," NHK Laboratories Note, Ser. No. 314, Mar. 1985.

Smith, et al, "Music Information Retrieval Using Audio Input." Proc AAAI Spring Symposium on Intelligent Integration and Use of Text, Image, Video and Audio Corpora, pp. 12-16.

Steele, R. et al., "Simultaneous Transmission of Speech and Data Using Code-Breaking Techniques," The Bell System Tech. Jour., vol. 60. No. 9. pp. 2081-2105, Nov. 1981.

Steele, R. et al., "Embedding Data in Speech using Scrambling Techniques," IEEE International Conference on Acoustics, Speech and Signal Processing, vol. 3, May 1982.

ten Kate, et al., "Digital Audio Carrying Extra Information," Philips Research Labs, pp. 1097-1100, IEEE 1990.

Wagner, "Fingerprinting," 1983 IEEE, pp. 18-22.

Wold et al, Content-Based Classification, Search, and Retrieval of Audio, IEEE Multimedia Magazine, Fall, 1996.

Feb. 22, 2007 Amendment After Allowance; Feb. 22, 2007 Request under 37 CFR 1.48(b) (updating inventorship); Dec. 13, 2006 Notice of Allowance (including list of references cited by examiner); Nov. 20, 2006 Pre-Brief Appeal Conference; Sep. 26, 2006 Pre-Brief Conference request; Sep. 22, 2006 final Office Action; and Jul. 6, 2006 Amendment; all from assignee's U.S. Appl. No. 10/126,921 (now U.S. Patent No. 7,266,704).

Nov. 24, 2008 Appeal Brief; Oct. 1, 2008 Pre-Brief Appeal Conference decision; Sep. 24, 2008 Pre-Brief Conference request and Amendment after final; Jun. 27 final Office Action; Mar. 18, 2008 Amendment; and Oct. 18, 2007 non-final Office Action (including list of references cited by examiner); all from assignee's U.S. Appl. No. 10/795,123 (published as US 2004-0243634 A1).

Jan. 7, 2009 non-final Office Action; Aug. 29, 2008 Appeal Brief; Oct. 30, 2007 final Office Action; May 1, 2007 Amendment; Nov. 1, 2006 non-final Office Action (including list of references cited by examiner); all from assignee's U.S. Appl. No. 10/622,180 (published as US 2004-0059933 A1).

Jan. 15, 2009 non-final Office Action from assignee's U.S. Appl. No. 11/614,947 (published as US 2007-0208711 A1).

Feb. 2, 2009 Amendment and Oct. 2, 2008 non-final Office Action; each from assignee's U.S. Appl. No. 11/614,921 (published as US 2007-0156726 A1).

Dec. 18, 2008 non-final Office Action in assignee's U.S. Appl. No. 11/614,942 (published as US 2007-0192352 A1).

International Search Report and Written Opinion, PCT/US06/32011, dated Oct. 4, 2007, 9 pages.

Written Opinion, PCT/US02/12171, dated Aug. 18, 2003, 6 pages.

Office Action, U.S. Appl. No. 10/126,921, dated Jun. 28, 2006, 16 pages.

Amendment, U.S. Appl. No. 10/126,921, dated Jul. 6, 2006, 10 pages.

Kalker, "System Issues in Digital Image and Video Watermarking for Copy Protection," 1999, pp. 562-567.

Choudhury et al., "Copyright Protection for Electronic Publishing Over Computer Networks," 8302 IEEE Network 9, No. 3 (1995).

"Multimedia Mixed Object Envelopes Supporting a Graduated Fee Scheme via Encryption," IBM Technical Disclosure Bulletin vol. 37, No. 03, pp. 413-417, Mar. 1994.

Sibert et al., "DigiBox: A Self-Protecting Container for Information Commerce," Electronic Publishing Recourses, Inc., originall published in the Proceeding of the First USENIX Workshop on Electronic Commerce, Jul. 1995.

Griswold, "A Method of Protecting Copyrights on Networks," Proc. Technological Strategies for Protecting Intellectual Property in the Networked Multimedia Environment, 1994.

Perritt, "Permission Headers and Contract Law," Proc. Technological Strategies for Protecting Intellectual Property in the Networked Multimedia Environment, 1994.

Strategies for Protecting Intellectual Property in the Networked Multimedia Environment, 1994.

Program and System Information Protocol for Terrestrial Broadcast and Cable (Revision A) and Amendment No. 1, Advanced Television Systems Committee, Rev. A—May 31, 2000, 135 pages.

Amendment No. 3 to Revision A of ATSC Standard: Program and System Information Protocol for Terrestrial Broadcast and Cable, Doc. A/65—(May 31, 2000) (Draft Amendment), Oct. 15, 2001, 4 pages.

Perry et al., Progress Report of the Co-Chairs of the Broadcast Protection Discussion Subgroup of the Copy Protection Technical Working Group, Apr. 8, 2002, 6 pages.

Protecting Against Unauthorized Redistribution of Digital Broadcast Content, Presentation to the CPTWG Intel, Hitachi, Matsushita, Sony and Toshiba, Nov. 28, 2001, 9 pages.

Requirements for the Protection of Unencrypted Digital Terrestrial Broadcast Content Against Unauthorized Redistribution, Discussion Draft, Apr. 14, 2002, 13 pages.

Requirements for the Protection of Unencrypted Digital Terrestrial Broadcast Content Against Unauthorized Redistribution, Discussion Draft, Redline version, Apr. 14. 2002, 13 pages.

U.S. Appl. No. 60/256,628, filed Dec. 18, 2000, Levy.
U.S. Appl. No. 60/285,514, filed Apr. 20, 2001, Rhoads.
U.S. Appl. No. 60/315,569, filed Aug. 28, 2001, Levy.
U.S. Appl. No. 60/336,209, filed Dec. 30, 2001, Levy.
U.S. Appl. No. 09/571,422, filed May 15, 2000, Rhoads.
U.S. Appl. No. 09/620,019, filed Jul. 2, 2000, Levy.

PCT/US01/49395, Written Opinion, dated Aug. 18, 2003 (6 pages), Notification of Transmittal of International Preliminary Examination Report, dated Nov. 27, 2002, Notification of Transmittal of The International Search Report or the Declaration and International Search Report, dated May 31, 2002.

Mar. 22, 2006 Notice of Abandonment; Apr. 15, 2005 non-final Office Action; each from U.S. Appl. No. 10/017,679 (published as US 2003-0056103 A1).

Oct. 25, 2010 final Office Action from U.S. Appl. No. 11/865,557.

Koch et al., "Copyright Protection for Multimedia Data," Dec. 1994, pp. 1-15.

Upthegrove, "Intellectual Property Header Descriptors: A Dynamic Approach," Proc. Technological Strategies for Protecting Intellectual Property in the Networked Multimedia Environment, 1994.

Matsui et al., "Video-Steganography: How to Secretly Embed a Signature in a Picture," IMA Intellectual Property Project Proceedings, Jan. 1994, vol. 1, Issue 1, pp. 187-204.

Matsutani, et al., "The Construction of Copyright-Protected Image Data Technical Report of IEICE," ISEC94-58, 1995, 20 pages.

Quisquater, J., "Access Control and COpyright Protection for Images WorkPackage 3: Evaluation of Existing Systems," Apr. 19, 1995, 68 pages.

Quisquater, J., "Access Control and COpyright Protection for Images WorkPackage 8: Watermarking," Jun. 30, 1995, 46 pages.

Quisquater, J., "Access Control COpyright Protection for Images, Conditional Access and Copyright Protection Based on the Use of Trusted Third Parties," 1995, 43 pages.

* cited by examiner

| Unique ID | | | | |
|---|---|---|---|---|
| Content Owner ID | Content ID | Distributor ID | VOD Operator ID | Retailer ID |

| Unique ID | | | Usage Rules |
|---|---|---|---|
| Content Owner ID | Content ID | Distributor ID | Distributor Usage Rules |
| Content Owner ID | Content ID | VOD Operator ID | VOD Operator Usage Rules |
| Content Owner ID | Content ID | Retailer ID | Retailer Usage Rules |
| Content Owner ID | Content ID | N/A | Consumer Usage Rules |

Fig. 8

| Unique ID | | | Usage Rules | Billing Information |
|---|---|---|---|---|
| Content Owner ID | Content ID | Distributor ID | Distributor Usage Rules | Price to VOD Operator |
| Content Owner ID | Content ID | VOD Operator ID | VOD Operator Usage Rules | Price to Retailer |
| Content Owner ID | Content ID | Retailer ID | Retailer Usage Rules | Price to Consumer |
| Content Owner ID | Content ID | N/A | Consumer Usage Rules | Price to Distributor |

Fig. 9

| Central Router Database | |
|---|---|
| Content Owner A ID | Content Owner A IP address |
| VOD Operator B ID | VOD Operator B IP Address |

| Content Owner A Database | | | | |
|---|---|---|---|---|
| Unique ID | | | Usage Rules | Billing Information |
| Content Owner ID | Video D ID | VOD Operator ID | VOD Operator Usage Rules | Price to Consumer |
| Content Owner ID | Video D ID | N/A | Consumer Usage Rules | Price to VOD Operator |

| VOD Operator B Database | | |
|---|---|---|
| Unique ID | Usage Rules | Billing Information |
| Content Owner ID | Video D ID | VOD Operator Usage Rules | Price to Consumer |

SYSTEMS AND METHODS USING DIGITAL WATERMARKING AND IDENTIFIER EXTRACTION TO PROVIDE PROMOTIONAL OPPORTUNITIES

RELATED APPLICATION DATA

This application is a continuation in part of U.S. patent application Ser. No. 10/126,921, filed Apr. 18, 2002 (published as US 2002-0186844 A1). The Ser. No. 10/126,921 application is a continuation in part of U.S. patent application Ser. No. 10/017,679, filed Dec. 13, 2001 (published as US 2003-0056103 A1). The Ser. No. 10/017,679 application claims the benefit of U.S. Provisional Application Nos. 60/256,628, filed Dec. 18, 2000 and 60/336,209, filed Oct. 30, 2001. The Ser. No. 10/126,921 application also claims the benefit of U.S. Patent Application Nos. 60/285,514, filed Apr. 20, 2001 and 60/315,569, filed Aug. 28, 2001. This application is also related to the present assignee's U.S. Pat. No. 6,505,160 and published U.S. patent application No. US 2002-0052885 A1. Each of the above-mentioned patent documents is hereby incorporated by reference.

TECHNICAL FIELD

The present invention relates to integrating content identifiers with digital rights management systems. The present invention also relates to multimedia signal processing, such as steganographically encoding auxiliary information into media signals, and decoding the auxiliary information from the media signals.

BACKGROUND AND SUMMARY OF THE INVENTION

Management of digital assets becomes an increasingly difficult challenge as digital content proliferates. The term "content" is broadly defined herein and may include audio, video, images, electronic data, biometric information, graphics and designs, electronic documents, copyrighted materials, software, multimedia content, etc., etc. Sometimes we interchangeably use the term "media" for "content" in this document. Enhancements in computer networking and database technology allow companies to manage large content collections and to make the content available to third parties. While network communication provides a powerful tool to enable a database manager to share content with others, it makes it more difficult to control and track how the content is being used.

For example, some companies maintain extensive content databases to promote their products. Customers or service providers such as advertising and marketing firms can access this content remotely via an internet, extranet, web site, intranet, LAN, WAN, wireless network or file transfer transactions. Although computer networking telecommunication technology facilitates access, it makes it difficult to ensure that customers and services providers are getting the latest content, and that they are getting accurate and helpful information relating to the content.

There is a need to enable digital rights management systems to reliably link content with additional, related data—including related content. The terms "link" and "linking" are defined broadly herein to include associating, pointing to, facilitating the access of, linking, connecting or connecting to, revealing a storage address of, and/or facilitating database interrogation, etc. There is also a need for a digital rights management system to reliably link content with related usage billing information. One way to associate content with information about the content is to place the information in a file header or footer (we interchangeably use the terms "header" and "footer" in this application). This approach is not terribly attractive because the added information often does not survive file format changes, conversion to the analog domain, and is susceptible to being stripped away, etc. We believe that an improved approach to associate content with related data is to steganographically hide identifying information within the content. One example of steganography is digital watermarking.

Digital watermarking is the science of encoding physical and electronic objects with plural-bit digital data, in such a manner that the data is essentially hidden from human perception, yet can be recovered by computer analysis. Most commonly, digital watermarking is applied to media such as images, audio signals, and video signals. However, it may also be applied to other types of data, including documents (e.g., through line, word or character shifting), software, multi-dimensional graphics models, and surface textures of objects. In physical objects, the data may be encoded in the form of surface texturing, or printing. Such marking can be detected from optical scan data, e.g., from a scanner, optical reader, input device, digital camera, or web cam. In electronic media (e.g., digital audio or imagery—including video), the data may be encoded as slight variations in sample values. Or if the media is represented in a so-called orthogonal domain (also termed "non-perceptual," e.g., MPEG, DCT, wavelet, etc.), the data may be encoded as slight variations in quantization values or levels. The assignee's U.S. Pat. Nos. 5,862,260, 6,122,403 and 6,614,914 are illustrative of certain digital watermarking technologies and are each hereby incorporated by reference. A great many other approaches are familiar to those skilled in the art. The artisan is presumed to be familiar with the full range of literature about steganography, data hiding and digital watermarking.

Digital watermarking systems typically have two primary components: an encoder that embeds the watermark in a host media signal, and a decoder that detects and reads the embedded watermark from a signal suspected of containing a watermark (e.g., a suspect signal). The encoder embeds a watermark by altering the host media signal. For example, the encoder (or embedder) component embeds a watermark by altering data samples of the media content in the spatial, temporal or some other transform domain (e.g., Fourier, Discrete Cosine, Wavelet Transform domains). The decoder component analyzes a suspect signal to detect whether a watermark is present. In applications where the watermark encodes information, the decoder extracts this information from the detected watermark.

The analysis of the detected data can be accomplished in various known ways. Presently, most steganographic decoding relies on general-purpose microprocessors that are programmed by suitable software instructions to perform the necessary analysis. Other arrangements, such as using dedicated hardware, reprogrammable gate arrays, or other techniques, can of course be used.

According to one aspect of our invention, a digital watermarking system includes (or communicates with) a secondary component—a database. Such a database preferably includes data related to content. The related data may include, e.g., content owner or copyright information, metadata, usage rights, enhanced or interactive content, and billing information, etc. (The terms "usage rights" (or interchangeably: "usage rules") are broadly intended in this application. Usage rights identify permissible (or restricted) actions or uses associated with content. A few of the many examples include play control, encryption requirements, rendering restrictions, required permissions, etc.) The above related data is preferably organized or linked according to respective content identifiers. For example, if the content includes a song and the related data includes usage rules, then the usage rules can be associated with the song via a content identifier that is unique to the song or to a class of related songs. The database can be stored locally, remotely, or both. The database can also be distributed, with different databases stored in different networks or locations, such as a complete central and mirrored database and local databases including only subsets of the related data on a local computer. Of course our usage of the term database throughout this document is broad enough to include software-based databases, data structures, data records, etc., etc.

User-friendly digital rights management systems are preferred in our evolving digital and connected world. Many digital rights management systems fail because they focus solely on the content owner's security desires and not on consumer usage. As such, these rights management systems are not acceptable to consumers. A historical example is taken from the software industry in the 1980's, when that industry abandoned copy protection. We have solved some of the failing associated with traditional digital rights management systems. Our inventive user-friendly digital rights management system provides transparent usage models to consumers while protecting the content. In one implementation, a user-friendly rights management system enables consumers to easily purchase content that they want to play or use, as opposed to stopping consumers from using the content. One benefit of our inventive system is that it is now easier for a mass market to purchase content, rather than use -illegitimately obtained content.

In one embodiment of the present invention, a digital watermark embedded within a content item is used to convey a content identifier(s). In a second embodiment, file headers associated with a content item include a content identifier(s). In still another embodiment, both digital watermarks and file headers are used to carry content identifiers. Content identifiers can be linked to related data, such as "usage rights" (or "usage rules") common in some digital rights management (DRM) systems. (The artisan is presumed familiar with the many DRM systems, a few of which are described in U.S. Pat. Nos. 5,765,152, 5,410,598, 5,943,422, 6,363,488 and 6,330,670, which are each hereby incorporated by reference. Of course there are many other DRM systems and DRM-packaging that can be enhanced by the present invention.). These rules typically define the scope of permissible content use, e.g., such as regulating printing, viewing, copying, altering, distributing, selling, etc. Digital watermarks—including a content identifier—can be used for content tracking and data management. In another embodiment, digital watermarks are used in connection with DRM content containers. Another aspect of the invention is a method of performing digital asset management of media content. In even another embodiment the copy protection state (also known as copy control information including copy freely, copy no more, copy never, and/or copy once) can be overridden through linking the identifier to usage rules, if the usage rules allow copy protection information to be overridden, e.g., to enable the sale or distribution of the content. This enables the content owners to be properly paid, and users to share content, instead of merely prohibiting use of the content.

One aspect of the present invention provides content owners with copy protection security and royalty tracking, and end-users with an easy-to-use system that improves current content distribution methods, such as CD, DVD and VHS. A combination of watermarking and DRM techniques can be employed, where a watermark allows content to leave and be found outside an associated DRM package without harming the security of the system. The watermark identification can link the content to the usage rules, and, optionally, the usage rules can dictate whether the content should be re-packaged into the DRM package if found outside of it. This means that content found outside the DRM package can be purchased and used, as well as re-secured, as opposed to that content being considered illegal and perhaps destroyed. This inventive feature increases the revenue generated from the content. A DRM package is broadly defined and may include an encryption-based format, or a container in which content is securely maintained, etc. Artisans know many DRM packaging techniques, which may be suitably interchanged with the packaging aspect of the present invention. DRM systems help publishers or content owners prevent unauthorized copying, replication, usage or distribution of their software products, either via CD-ROM, via the Internet, transfer, etc. Other DRM systems incorporate encryption, digital signature and license manager technologies, and enable authentication from either a disc, online database, or from a PC hard drive. These technologies can be applied to secure CD-ROM or computer executable files, and to maintain desired control over the distribution of content during its life cycle. A DRM package that allows licensing and reporting provides an ideal rights management system for audio, video and images.

Still another aspect of the present invention is method of associating content with usage rights. The content includes a digital watermark embedded therein. The digital watermark (DWM) includes a DWM content identifier. The method includes: associating a digital rights management (DRM) content identifier with the watermarked content; populating a first rights registry with usage rights associated with the content, wherein the usage rights are indexed in the first rights registry with the DRM content identifier; and populating a second rights registry with at least some of the usage rights, wherein the at least some of the usage rights are indexed in the second rights registry with the DWM content identifier.

Yet another aspect of the present invention provides a method of associating content with usage rights. The content includes a digital watermark (DWM) having a DWM content identifier. The method includes: associating a digital rights management (DRM) content identifier with the watermarked content; populating a first rights registry with usage rights associated with the content, wherein the usage rights are indexed in the first rights registry according to the DRM content identifier; and populating a second rights registry with the DRM content identifier, wherein the DRM content identifier is indexed according to the DWM content identifier.

Still another aspect of the present invention provides a method comprising: receiving raw content exported from a first digital rights management (DRM) system; detecting a content identifier steganographically embedded in the raw content; using the content identifier and information associated with a second, different DRM system to obtain usage rights that are compatible with the second, different DRM system; receiving the usage rights; and providing the raw content and the usage rights to the second, different DRM system.

Still other aspects of the present invention provide a method to control a media server. The method includes, upon receiving a request to access raw content, searching the raw content for a content identifier steganographically embedded therein. If a content identifier is found: the method accesses a rights registry for usage rights associated with the content identifier; receives the usage rights from the rights registry;

presents the usage rights for user acceptance; and upon acceptance of the usage rights, provides the usage rights and raw content to a resident digital rights management (DRM) system to control access of the content.

Further features, aspects and advantages will become even more apparent with reference to the following detailed description and drawings.

BRIEF DESCRIPTION OF THE DRAWINGS

FIG. 8 illustrates the structure of FIG. 5, including billing information.

FIG. 9 demonstrates a distributed database exemplar system.

DETAILED DESCRIPTION

Rights Management System

Figure 1:
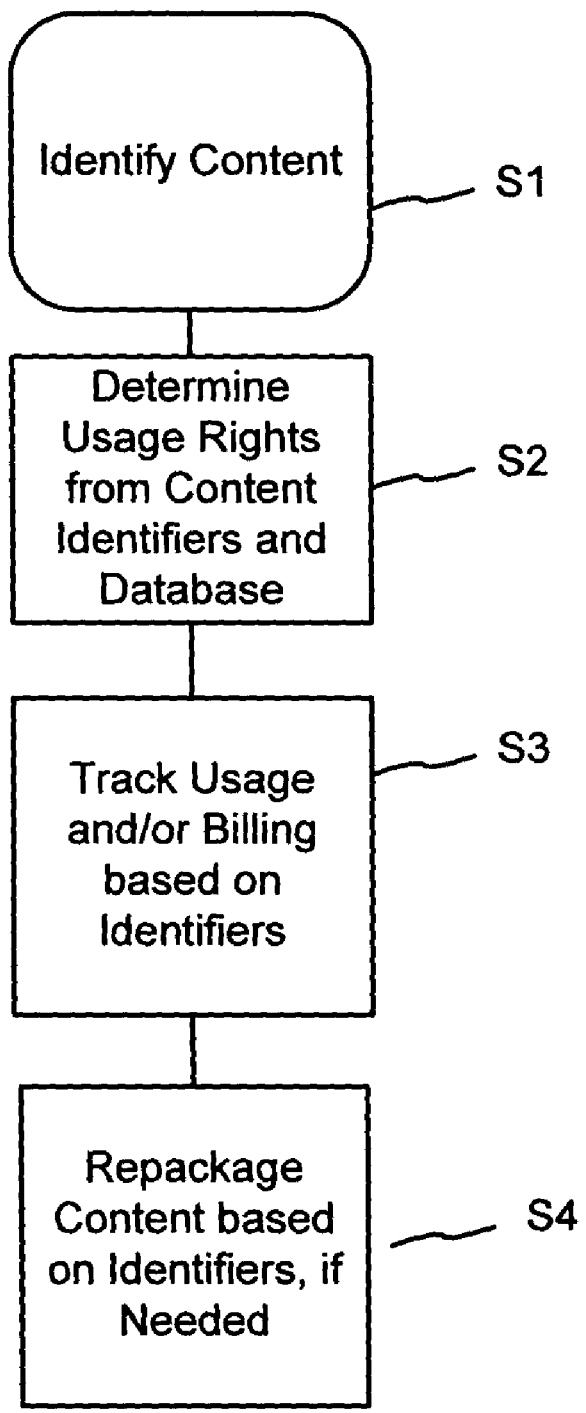
FIG. 1 illustrates a flow diagram of a content management process according to one embodiment of the present invention.

With reference to FIG. 1, a rights management system preferably includes four steps. In step S1, content, whether within an encryption package or not, is identified before rendering. ("Rendering" here has its familiar meaning of presenting for visual and/or audible inspection, e.g., on a TV, audio player, etc. Our use of the term "rendering" is broad enough to include transferring, copying and distributing.). Content is preferably identified by steganographically encoding data within the content, such as in the form of a digital watermark. The digital watermark preferably includes a unique content identifier. Content can be alternatively identified via frame and/or segment headers.

Usage rights are determined in step. S2 via linking the content identifier to external data (e.g., data defining the usage rules). In general, usage rules define the scope of permitted use for respective content. Examples of usage rules include the scope of permissible copying, rendering, transferring, altering, playing, viewing, printing, distributing, using, etc. Content identifiers can be used to organize a database that is maintained locally or remotely (e.g., a central usage system). Once extracted from content, an identifier can be then used to interrogate the database to retrieve the usage rules. Content usage is regulated based on its corresponding usage rules.

Content usage can be tracked via an identifier in step S3. This usage tracking can be used, e.g., for proper billing to the consumer and payment to content owners and providers. Tracking can be incremental or per content item. In one embodiment, each video frame or every nth frame (or audio segment) is uniquely or redundantly identified. Tracking identifiers per frame (or audio segment) allows for a "pay-as-you-go" system, in that a consumer can be billed for only the amount of content they view, access or listen to. In another embodiment, billing is based on a one-time access fee.

As a fourth and optional step (step S4), if content is found outside of its respective DRM, and it should be in the DRM package as dictated by related usage rules, the content identifier can help facilitate repackaging of the content in a DRM container. Initially, the identifier will help identify the content. The identifier can also identify or point to a specific package or packaging protocol, or the identifier can link to repackaging requirements. An identifier can also be linked to usage rules, which can regulate content usage, even for content outside of a package. Examples of content being located outside of a container include transferring the content to a different medium, or converting from a digital format to an analog format. Since the content identifier is content specific, e.g., it is associated with the content and not the container, it persists with the content, even when the content is found outside of a container. The order of steps S3 and S4 can of course be interchangeable. For example, if usage rights do not exist (as determined in S2), content is packaged in a DRM wrapper. After content is identified and repackaged, it is tracked.

The preceding second through fourth steps preferably proceed on the assumption that the content has been packaged in an encryption container (or other DRM format) and digitally watermarked (or otherwise identified) prior or during distribution. Content that is neither protected nor identified can be handled under default system rules, such as allowing unrestricted usage or view-only usage.

In a preferred implementation, the identifier is provided via a digital watermark, potentially combined with header data for additional access. An advantage of a digital watermark identifier is that the watermark will typically survive end-user recording of the content onto new media or into a new format. This new format may be desirable for end-users to use multiple rendering devices, or used to try to bypass the security system. However, identifying the content itself helps to enforce security features and continue to track content, even when the content is found outside of a DRM container.

Optionally, the embedded data (e.g., a digital watermark) can provide fine-grain usage and quality of content monitoring as well as copy protection. An example of fine grain usage is to monitor content subsets, such as an audio segment or set of video frames. A watermark can be redundantly embedded per frame or segment, or different watermarks can be embedded per each frame or segment, to allow counting or monitoring of the content subsets.

Home Network System

Figure 2:
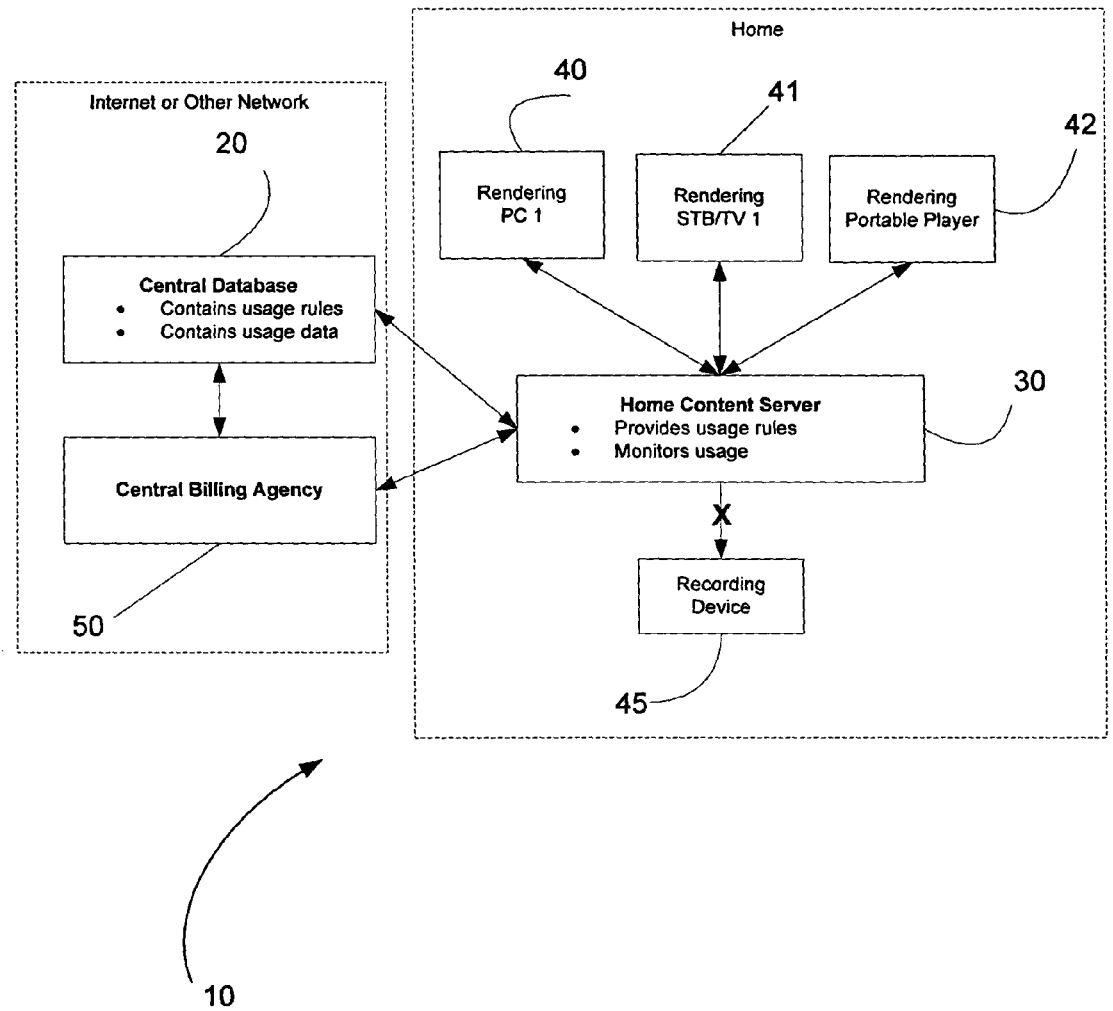
FIG. 2 illustrates a system for enhancing digital content management by identifying content, and linking the content with usage rules or permissions.

A home rights management system 10 is shown in FIG. 2. System 10 includes a local home network (indicated by the dashed-line box labeled "Home"). The local home network includes a home content server 30 in continuous or intermittent communication with rendering devices 40-42. The operation of our inventive system 10 is preferably indifferent to how content stored on the home content server 30 is initially obtained, and indifferent to whether the content is packaged in an encryption or other DRM package. The system 10 architecture and system 10 operations are described below.

Home content server 30 can include a personal computer that has downloaded compressed content from a web site or peer-to-peer site via the internet. Alternatively, home content server 30 can be a set-top box (STB) with suitable computing functionality. Or home content server 30 can include a storage device with computing, database and communication functionality. Of course, home content server 30 need not be located in a home, but may be located in an office, building, garage, theater, mobile computer, handheld device, etc.

Returning to FIG. 2, system 10 preferably includes and central database 20 and central billing agency 50. Central database 20 and central billing agency 50 can be associated or otherwise communicate (e.g., as shown by the dashed-line box labeled "Internet . . . " in FIG. 2). Of course the invention is not so limited. Indeed, there need not be interaction between database 20 and agency 50. In addition, agency 50 may be contacted only monthly, when, e.g., the home content server 30 reports its monthly usage. Central database 20 can communicate with home center server 30, via a network such as the internet (e.g., via a cable modem, modem or DSL), dial-up network, dedicated network, LAN, WAN, etc. Central database 20 is preferably contacted whenever new content, which was not sent with its usage rules to be stored in a local database such as home content server 30, enters the home network. In another embodiment, central database 20 includes a plurality of distributed databases, which are synchronized or which include specific subsets of content (e.g., based on region, genre, content, etc.). In another embodiment, central database 20 includes a plurality of peer-to-peer nodes. Database management software can be used to help track and manage content, content identifiers, and related content.

Central database 20 preferably maintains a set of usage rules. The usage rules define use limits (or permitted use) for related content. The usage rules can be communicated to various network locations, such as to home content server 30. Home content server 30 can query central database 20 to obtain or update usage rules, or updated rules can be pushed to home content server 30. Server 30 can also cache the usage rules locally, or can occasionally query database 20 to obtain updates, etc.

Preferably, each of rendering device PC 40, STB/TV (or VCR, PVR or DVD, etc.) 41 and portable player 42 communicates with home content server 30, either continuously or intermittently. In one embodiment, some or all of the rendering devices communicate over a wireless channel. Of course, the invention is not so limited. Indeed, the rendering devices can communicate through other channels as well (e.g., via USB, parallel ports, communication links, IEEE 1394, firewires, modems, coaxial cable, twisted pair, etc., etc.). In some implementations server 30 streams content to the rendering devices for real time play. In other implementations server 30 downloads the entire content or subset of the content to the devices. Some rendering devices may be able to decrypt the content (if the content is encrypted or other DRM protected) and detect a content identifier, e.g., an embedded digital watermark. Other rendering devices may rely on the home content server 30 for decryption (if needed) and identifier detection.

When content playing is requested, a rendering device 40-42 or home content server 30 checks the content item and/or frame headers for an identifier. In one embodiment, checking for an identifier includes a watermark detection process. In another embodiment, checking the content item includes extracting data from a file header. In still another embodiment, checking for an identifier involves both checking header data and detecting an embedded watermark. In the case of checking a file header, if an identifier is found, and it is not part of an authenticated encryption package, it is self-authenticated. (This is particularly so when dealing with digital signatures or encryption authentication, etc.). This self-authentication process helps to ensure that the identifier has not been modified, including that it has not been copied from other content.

If a header identifier is not available or trusted, the content can be searched for a watermark identifier. (Alternatively, in another embodiment, an initial search for a watermark identifier is made.). Watermarks are inherently trusted due to the secrecy of their embedding key and/or self-authentication features. In an alternative embodiment, a so-called fragile watermark is used to enhance the security of an identifier. A fragile watermark can be designed to be lost, or to degrade predictably, when the data set into which it is embedded is processed in some manner. Thus, for example, a fragile watermark may be designed so that if an image is JPEG compressed and then decompressed, the watermark is lost. Or if an image is printed, and subsequently scanned back into digital form, the watermark is corrupted in a foreseeable way. Similarly, if a video or audio signal is converted from digital to analog the fragile watermark is corrupted or altered. (Fragile watermark technology is disclosed, e.g., in commonly assigned applications 09/234,780, 09/433,104, 09/498,223, 60/198,138, 09/562,516, 09/567,405, 09/625,577, 09/645,779, and 60/232,163.). By such arrangements it is possible to infer how a data set has been processed by the attributes of a fragile watermark embedded in the original data set.

If the content is not identified, the home content server 30 (or rendering device) can handle the content according to a default usage rule or otherwise in a predetermined manner. For example, the server may allow unrestricted usage, or may permit a onetime play with copy restrictions. Alternatively, the home content server 30 may query central database 20 to receive guidance.

Once the content is identified, however, and the central database 20 provides usage rules associated with the content identifier, the home content server 30 or rendering device 40-42 determines whether, and/or to what extent, the content can be rendered according to the usage rules. The rendering device 40-42 may enforce these rules, or the home content server 30 may enforce them by withholding content from a rendering device 40-42 and 45 that it is not authorized to render the content. Since content is identified by content identifiers (e.g., digital watermark data), content can be tracked, managed, and rendered, even if it has left an encryption package. Indeed, linking an identifier to usage rules helps to ensure that the content can be controlled, even with out an encryption package.

In another embodiment, embedded data (e.g., watermark data) is extracted and used to determine if the content is even allowed outside an encryption package, and cause any open format content to be encrypted before it is played.

The identifier can also allow usage (e.g., playing, recoding, transferring, etc.) of the content to be tracked. In one embodiment, the tracking monitors each time that a content item is accessed. In another embodiment, the tracking determines how much of the content item is actually played. For example, if an identifier is continuously embedded throughout the content, either as metadata in frames or as digital watermarks, the identifier can be used to track how much of the content is played (e.g., a digital watermark counter). Further discussion regarding these and other techniques are found in assignee's U.S. Pat. No. 6,522,769, hereby incorporated by reference. Otherwise, frame-counting (or group of frames-counting) techniques can monitor the amount of content usage.

System 10 can optionally save watermark "bookmarks," so users can begin playing where they left off. In this case, a watermark identifier can be used to uniquely identify a location, chapter or segment within the content item. An identifier can then be used to index back into the content, much like a conventional bookmark.

A watermark identifier can also be even used to track quality by checking for degradation of the embedded data, such as through bit errors.

The home content server 30 can use tracking information (e.g., amount of content played, which content is accessed, types of use, etc.) to interact with a central billing agency 50. Central billing agency 50 can communicate with home content server 30 via the internet or other communications channel.

Central billing agency 50 can help facilitate billing for content consumed and/or used. Central billing agency 50 can also help ensure that other system participants, including content owners and providers, are properly paid. Optionally, the billing agency can provide information to the consumer about current billing and pricing on content before playing the content.

If content is not allowed to be played on the local home system or its usage rights are not know, the home content server 30 can obtain rights from central database 20. This process can be facilitated via internet or other communications channel. Alternatively, central or local information linked to an identifier can be used to provide the end-user directions on how to obtain rights. Thus, if content is obtained elsewhere, possibly from a file-sharing network or directly from a friend, the usage rights can be easily obtained from identifier-provided information. (Additional disclosure regarding using embedded data with file sharing can be found in assignee's U.S. patent application Ser. No. 09/620,019, filed Jul. 20, 2000.).

While the content is being played, the content identifier can be optionally used to provide or link to other information via additional data and links maintained in a content server or central database 20. This information can include new releases by the same artist or director, similar movies or songs, and related merchandise, etc. (U.S. patent application Ser. Nos. 09/620,019 and 09/571,422, filed May 15, 2000, include disclosure regarding linking to other information and actions via embedded data.). In addition, this information may provide opportunities to purchase the described or related items. Additionally, the identifiers can be used to link to interactive content, such as found on a web site.

A watermark identifier can provide additional advantages, such as providing copy protection bits within the embedded data that can be used to restrict or prohibit distribution (e.g., copying, transferring, rendering, etc.) of content to a format or media that may allow illegal distribution, such as a recordable DVD or CD. For example, home content server 30 may prohibit transfer of content, based on the copy protection bits, to recording device 45. If copy protection bits require that the content cannot be copied, but a content identifier links to usage rights or to a copy permission (either of which indicates permission for re-using or copying the content), the subsequently obtained permission preferably overrides the copy protection bits. In this case, a billing or central router can communicate to the home content server a permission (or updated usage rule) to indicate that the content can be re-used or copied according to permission. Hence, the permission or updated usage rule trumps the copy protection bits. (Of course obtaining the permission can be conditioned on payment or other billing requirements.). For non-DVD video and non-DVD or SDMI audio content, the presence of a specific watermark protocol can identify the content as protected. A fragile watermark can also be added for copy-once (i.e. one generation) capabilities, if desirable. In another embodiment, the presence of the watermark is determined in hardware, without reading the payload bits, thus reducing the cost of the copy control hardware. Then, the watermark payload is decoded in software. (Further discussion regarding copy control bits can be found, e.g., in assignee's U.S. patent application Ser. No. 09/620,019.).

Thus, our rights management system is transparent and easy-to-use for the end-user, and allows copyright owners to protect and robustly track their content.

Distribution Chain

Traditionally, content is sent in a distribution chain from a content owner to a distributor, and then on to a service provider (e.g., a VOD service provider) that may include either (or both) of a cable/satellite operator and online retailer. The content is then provided to a client (e.g., a home consumer). Our distribution chain, e.g., such as a video on demand (VOD) chain, is now described with respect to FIG. 3.

Figures 3, 4, 5:
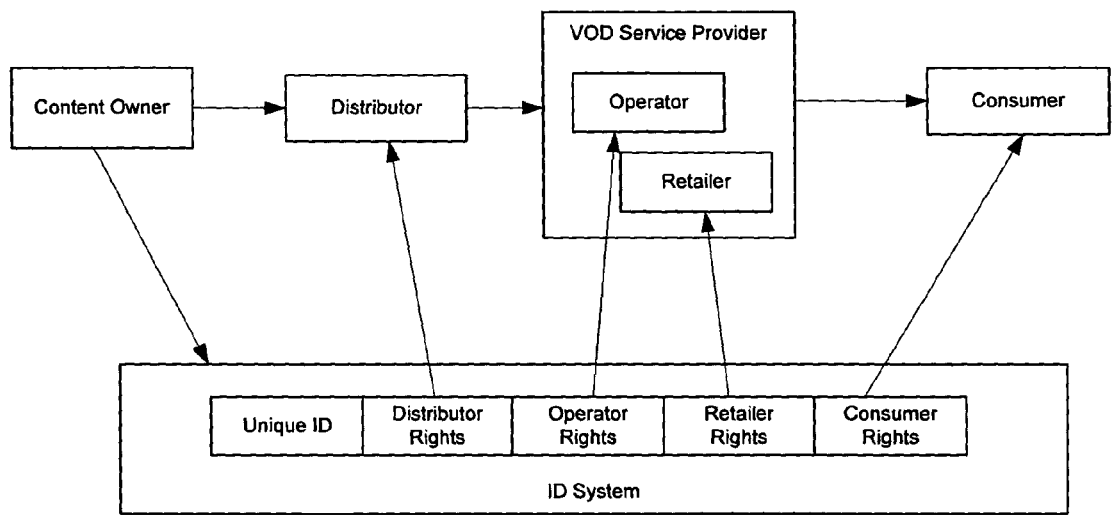
FIG. 3 illustrates an inventive content distribution chain.
FIG. 4 illustrates a content identifier format.
FIG. 5 illustrates a database structure for the distribution chain illustrated in FIG. 3.

The content is preferably uniquely identified. Content can be identified, e.g., by a digital watermark. In some cases the digital watermark includes a unique ID. The unique ID preferably includes at least a content identifier, and may also include a content owner ID, distributor ID, VOD service provider ID and/or a Retailer ID, as shown in FIG. 4. Of course alternative or additional fields can be used for a unique ID.

The unique ID and usage rules (e.g., for each of the distributor, operator, retailer, and consumer) are preferably created by the content owner and entered into an ID system. In one embodiment, an owner creates a unique ID by querying an ID system (or database) to obtain a unique identifier. These usage rules (or "rights") regulate the permissible use by the various distribution chain participants. The usage rules are indexed via the unique ID. The ID system preferably includes a database to help manage the content owner's unique IDs and usage rules and to help ensure that any given ID is not redundantly assigned. Preferably, the unique ID can be read at various participant points in the FIG. 3 distribution chain. The unique ID can be used to determine the usage rules at these various participant points. For example, the Distributor can access the unique ID and query the ID system to retrieve distributor-related usage rules. The ID System may optionally include an authenticated method to identify the participant (e.g., distributor, service provided, consumer). There are many suitable authenticating methods known in the art, e.g., such as providing a user ID, account number, IP address, digital signatures, numeric identifiers, etc. Of course other authenticating methods may be suitably interchanged with this authentication aspect of the present invention. The ID system determines the proper usage rules for a requesting participant and then returns the usage rules to them. The ID system can also return other desired information or links (e.g., URL, IP address, e-mail list, etc.). For example, the ID system may return a link to access information regarding the actors in a subject movie and their new releases. Or the link may relate to a particular audio file or song that is being played by the consumer. If a proprietary player or plug-in to the player is provided by the last member of the chain before the consumer, such as the retailer, the retailer ID does not need to be embedded and can be obtained from the proprietary player. However, if this content is found unpackaged outside the authorized consumer environment, it is advantageous to have the retailer ID as part of the digital watermark unique ID so the retailer's rules can be applied and the retailer is properly paid for that content.

The ID system can include a master database or a plurality of databases. (Of course the ID system will typically include a computer or server, running database management software, to help manage the database.). Our preferred database format, shown in FIG. 5, is used when a unique ID includes the ID of the requesting participant (e.g., Distributor ID, retailer ID, etc.) and its related usage rules. With this format, the unique ID identifies the requesting participant. So during a database interrogation no additional information, besides the Unique ID, needs to be communicated to the database. The participant verification can be enhanced by using authenticated IDs including encryption and digital signatures, as well as different watermark algorithms (or payload structures) for each participant, where only that participant knows the algorithm. The secret part of the algorithm may vary a pseudo-random (PN) sequence for each participant. This process is also known as secret key watermarking.

Figure 6:
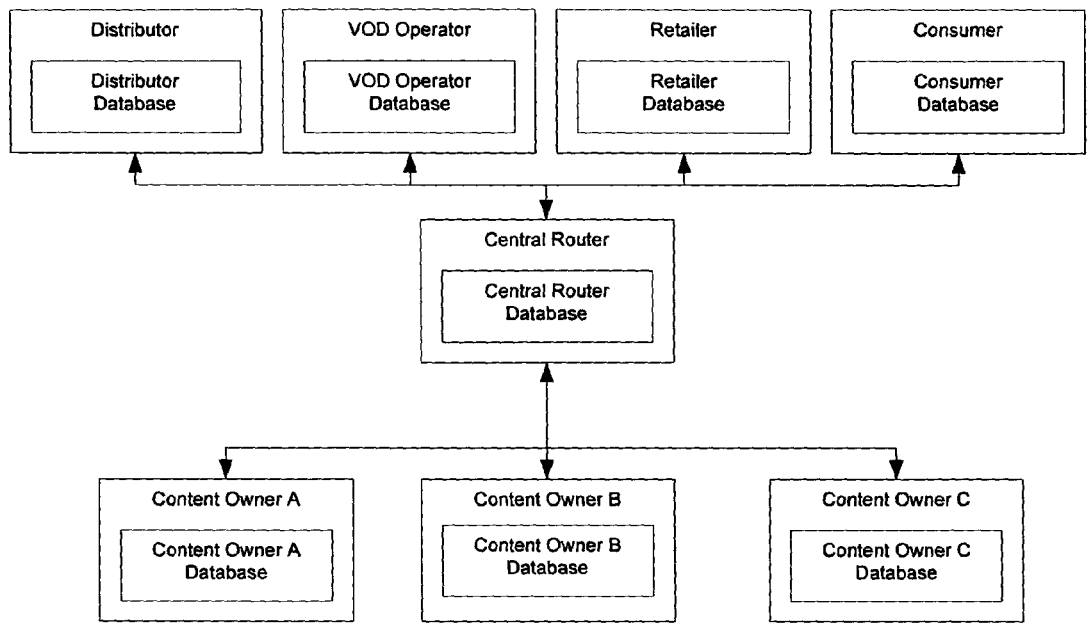
FIG. 6 illustrates an intelligent content distribution system, including linking databases via a central router to enhance efficiency and privacy of metadata.

The ID system may be maintained on one or many distributed central servers, as well as being "intelligently" distributed, as shown in FIG. 6. Intelligent distribution includes storing various unique IDs and usage rules (and optionally related content, e.g., URLs, IP addresses, etc.) on local databases within each participant site of the distribtuion chain shown in FIG. 3 (e.g., in the Distributor Database or the Retailer Database, etc.). Preferably, the locally stored data is relevant only to the local participant. For example, the VOD Operator Database preferably includes only those usage rules that are relevant to the VOD operator. Or the Consumer database includes only those usage rules and related content that are relative to the subject video (or audio) content.

A content owner creates (for his/her content) unique IDs and usage rules (and optionally related content) for each of the distribution chain participants. In one implementation, a content owner creates a unique ID by query central router database to obtain a suitable ID. Of course many content owners (A-C) may create unique IDs and usage rules as shown in FIG. 6. A central router and database are used to route the usage rules and any related data to a correct distribution chain participant. The central router database preferably only includes content owner IDs and content owner database addresses. In addition, the unique ID and database content is pushed from a content owner database to each other participant, including the consumer for content that she has licensed, through the central router. The database content can include the original content (videos, audio, etc.), usage rules and any related content (e.g., URLs, IP addresses, web pages, etc.). The pushed database content preferably includes only that information which is relevant to a particular participant. The distributor, VOD operator, retailer and consumer databases preferably only include the usage rules for that distributor, VOD operator, retailer and consumer, respectively. Local databases (e.g., the consumer and distributor databases) can be automatcically updated such as hourly, daily, weekly, etc., to remain fresh and up-to-date information. No one database or router needs to include all the content's usage rules, which helps to ensure security for the content. Participants also benefit since they rarely need to request usage rules from the central server because the usage rules for their content are regularly pushed to them. The usage rules can be periodically updated. In the example structure shown in FIG. 5, the database entries which include that participant's ID and related information are stored in that participant's network and database.

Billing System

Figure 7:
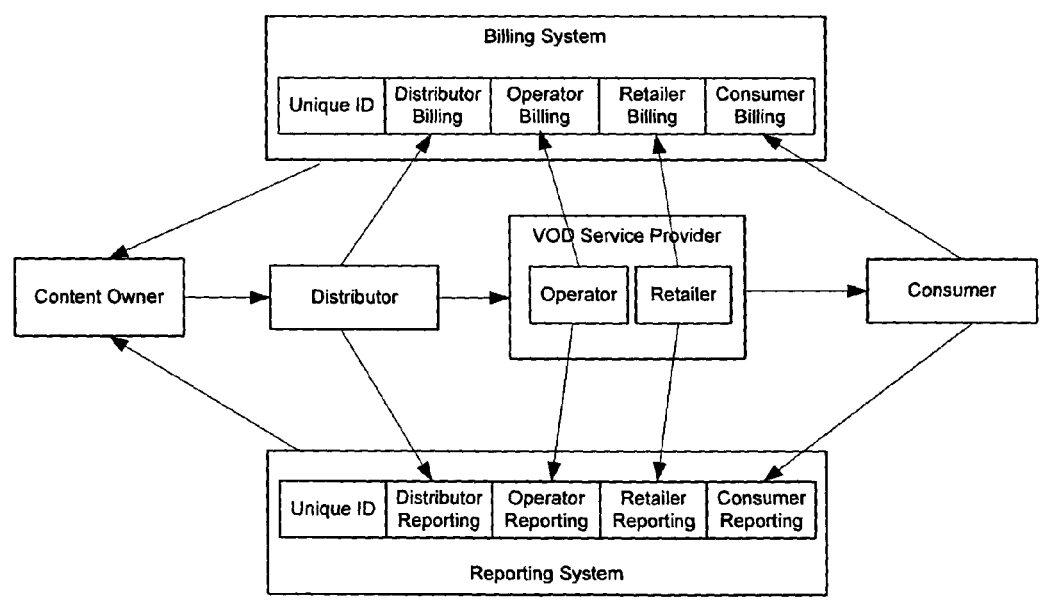
FIG. 7 illustrates a content distribution chain including a reporting system and a billing system.

The FIG. 4 unique ID can be used to maintain usage reporting and royalty billing, as shown in FIG. 7. FIG. 7 shows a centralized Reporting System and a centralized Billing System. Of course these systems can include computers and/or servers, tracking and accounting software executing on the servers and computers, and communications hardware/software, etc. The various participants (e.g., distributor, service provider, consumer, etc.) can be accurately billed for their access and/or handling of content based and tracked according to the unique ID. Of course the various participants can establish accounts with the billing system, to facilitated billing, automatic billing, etc. (In the case of a permission overriding copy protection bits, described above, a consumer can establish an account so that when she requests permission to distribute copy-protected content, the account is automatically billed when the permission to distribute is sent to the consumer.). Usage is preferably reported to the reporting system according to the unique identifiers. Of course, the Reporting Systems and Billing Systems shown in FIG. 7 can be distributed so that each participant keeps track of their own billing similar to the FIG. 6 distributed system.

Some of the above-mentioned databases are described as including usage rights. These databases can be expanded to include billing information, as shown in FIG. 8. When the modified data structures are accessed, usage information can be optionally stored in the consumer's home system and updated to central systems to help track usage reporting and royalty billing, as shown in FIG. 7. The billing and reporting systems do not usually need to receive updates as often as the content usage rules. For example, the billing and reporting systems may be updated from the home system every two weeks or every month or so.

EXAMPLE

A distribution chain including a content owner A, VOD operator B, consumer C, and a video D is presented by way of example to illustrate one aspect of the present invention. Related, intelligently distributed databases are show in FIG. 9, where the central router database is located in mirrored locations for the central router, the content owner A database is located in mirrored locations within the content owner A's network, and the VOD operator B database is located in mirrored locations within the VOD operator B's network.

For this example we assume that video D includes a digital watermark embedded therein. The digital watermark preferably includes a unique ID that at least uniquely identifies the video as video D. When consumer C wants to watch video D, the consumer's player (or plug-in to the player, or central home server, etc.) decodes the digital watermark to extract the unique ID. The extracted unique ID is communicated to the central database. The central database uses the unique ID to identify a VOD operator B identifier, which is used to locate the VOD operator B's database (or database IP address). The unique ID is also used to locate an owner A identifier (ID), which is used to locate a content owner A's database (or database IP address). (We note that an alternative implementation involves communicating a unique ID, like the one shown in FIG. 4, which also includes the content owner ID and VOD provider ID. The central database uses the content owner ID and VOD ID to find the appropriate owner and VOD database IP address.). Once found, the content owner A's database provides usage rights for consumer C's usage, and the VOD operator B's database provides the consumer's pricing. Then, consumer C is informed of their rights for viewing and the price of, oh say $4.00 per view, by the player. The consumer can signal acceptance via the player, or viewing the video D can be deemed acceptance of the terms.

For example, let's now suppose that the consumer C watches the video D one and a half times. The amount of viewing is locally tracked in the player by counting or detecting digital watermarks that are embedded in video frames throughout the video D, e.g., embedded to correspond with 1 second intervals. The player reports the usage (along with the unique ID) to the central router database (or alternatively to the VOD operator B database). The amount owed for this usage, $6.00, can be recorded in the VOD operator billing information. (Of course, we expected that traditional billing methods, e.g., pre-authorization of a credit card or monthly billing, etc., can be used to collect or manage the amount due and can be stored locally until updated, such as to the VOD operator's billing system.). Based upon the unique ID, usage amount, and billing information provided to the content owner A via the VOD operator B, the content owner A is paid its share of the amount owned, e.g., perhaps 50% of the $6.00 (or $3.00).

Alternatively, a third party or clearinghouse is used for billing and reporting. In this case the player can report the unique ID and usage amount to the third party. Of course it would be beneficial to allow the content owner A access to the third party reporting to understand the amount and type of their content that is used.

Re-Associating Usage Rights

The following sections outline methods and systems to manage and associate Usage Rights with content during content creation and content usage, re-associate Usage Rights when content is found out side of its intended Digital Rights Management packaging, and re-associate Usage Rights when content transfers between two Digital Rights Management Systems. Digital Rights Management (DRM) generally refers to administration of Usage Rights in a digital environment. DRM systems use technologies (e.g., usually including encryption) to protect digital content from unauthorized use. One example of DRM-packaged content includes encrypted content and metadata. The metadata typically includes a DRM Content Identifier, related content information (e.g., title and artist) and Usage Rights. Usage Rights define or govern how the encrypted content should be used. As a brief summary, Usages Rights are initially associated with content during content distribution. A distribution point may include, e.g., a pre-release, promotion, radio play, consumer retail, placement within a movie or game, etc. A DRM system is helpful in this process and assigns a DRM Content Identifier to content. A digital watermark (DWM) is also embedded in the content and carries a DWM Content Identifier. Sometimes raw or naked content is found outside of its DRM packaging. A DWM content identifier is used to help manage and re-associate raw content with Usage Rights. Additional features and advantages are discussed below.

A few definitions are provided to even further ease understanding of the following sections:

Content: Content may include audio, video, still images, multi-media (e.g., movies or electronic games), etc. The term "content" is sometimes interchangeably used with "media".

Media Server: A Media Server is a consumer or portable device including a central processing unit (CPU) and/or electronic processing circuitry and storage. The storage is preferably over ¼ gigabyte (GB). The Media Server preferably includes a Client Player Application, defined below, to play or render content. A Media Server also includes control software (or hardware) to carry out Media Server functionality as described below. Example Media Severs include a cell phone, MP3 player, iPod® and personal computers (e.g., desktop, laptop or handheld).

Client Player Application: A Client Player Application is usually software executed by a Media Server. The software interacts with a user and/or provides a graphical user interface (GUI). The Client Player Application facilitates playing or rendering of audio, images and/or video. Instead of software, a Client Player Application can be realized in hardware or firmware. An example Client Player Application includes "jukebox" software to play and manage songs on a personal computer, e.g., a modified version of iTunes®, Windows Media Player or an iPod® interface.

Content ID: A Content ID is a numerical (or alphanumerical) identifier that is uniquely associated with each piece of content, e.g., unique to a specific song or movie title. A Content ID is not necessarily unique for each copy (or file) of the piece of content. For example, two copies of the same song may include the same Content ID. A Content ID may be represented as a plural-bit identifier.

Copy Control Information (CCI): CCI is data (or information) to control whether content can be copied or played, e.g., never copy, copy once, no more copying, copy freely, and no redistribution. CCI data can be carried "out of band" with respect to associated content, e.g., in a header, footer or blanking interval, but can also be carried "in-band" through steganography.

Usage Rights: Usage Rights specify authorized (or restricted) uses of content. Usage Rights may also define related fees for such uses. Usage rights may define how and under what conditions content can be rendered, transferred, copied, shared, edited, played, etc. Often a collection of Usage Rights are defined for and associated with content intended for a specific distribution. The term "License" is sometimes interchangeably used with "Usage Rights."

Digital Rights Management (DRM): Digital Rights Management (DRM) generally refers to administration of Usage Rights in a digital environment. DRM systems use technologies (e.g., usually including encryption) to protect digital content from unauthorized use. Content associated with Usage Rights is sometimes referred to as "DRM-protected" or "DRM-packaged" content. One example of DRM-packaged content includes encrypted content and metadata. The metadata typically includes a DRM Content Identifier, related content information, and Usage Rules. A "public" DRM system is one that assigns, manages and controls distributed content and content for distribution (e.g., electronic downloading) to the general public consumer, whereas a "private" DRM system controls content distributed to a specific list of recipients, e.g., record label executives and music critics during a content creation process. A DRM system typical has two components, a "registration DRM component" and a "client DRM component." (A client DRM component is sometimes referred to as a "client DRM system.") A registration DRM component is involved in assigning Usage Rights to content and packaging content along with Usage Rights to produce DRM-packaged content, usually by a content owner, distributor or retailer. A registration DRM component may also populate a Rights Registry with Usage Rights. A client DRM component regulates DRM-packaged content to ensure that the content is used in accordance with associated Usage Rights. A client DRM component may reside and execute, e.g., on a Media Sever, and may even be incorporated into or cooperate with a Client Player Application.

Digital Watermark (DWM): A Digital Watermark is a form of steganography, as discussed above in the Background and Summary of the Invention. Digital Watermarking is detectable by software and/or hardware (e.g., a watermark "detector" or "reader"). A digital watermark may carry information, e.g., a plural-bit payload.

Rights Registry: A Rights Registry is a collection of Usage Rights. A Rights Registry may be stored locally with respect to a Media Server, but is usually stored in a remote database or memory structure. A Rights Registry is also referred to as a "Database of Usage Rights" and a "DRM Usage Rights Registry".

Consumer Equipment: Consumer Equipment is used in an entertainment environment, e.g., a consumer's personal or home domain. Consumer Equipment may include home, car, and portable and other entertainment equipment (e.g., game consoles, cell phones, music players, video players, etc.). A Media Server is an example of Consumer Equipment.

Consumer Environment: A Consumer Environment in one which includes Consumer Equipment, such as in the home, car, carried, etc.

We start with content creation. An audio content creation example is described with reference to FIG. 10. (Other types of content—video, images, etc.—are similarly protected with our inventive techniques. Also, the FIG. 10 steps are not intended to limit the present invention; rather, they are provided as general background and operating context.) A musician or band records music in a studio (S10). The recorded music (e.g., "draft content") is distributed (S11), e.g., to a controlled audience responsible for marketing the content such as A&R representatives. A&R (or "Artists & Repertoire") representatives are music industry executives whose primary role is identifying new musical talent that would appeal to a given market. The draft content can be changed (S12), if deemed necessary, according to A&R comments, among others, and then after changes are made is distributed (S13) to a wider but still limited audience, like focus groups. The draft content can again be modified or re-recorded, if deemed necessary, according to focus group comments. Pre-release comments are integrated in the draft content and a pre-release master (pre-final music version) is created. Pre-release comments are integrated in the draft content and a pre-release master (pre-final version intended for commercial release and sale) is created. Pre-release copies (e.g., digital files, compact discs or audio DVDs) are made from the pre-release master. The pre-release copies are distributed to music critics and radio stations (S14) among others. After some airtime and critic review, the musician or band may return to the studio to do final clean up. A production master (or final version) of the audio is produced (S15).

Figure 10:
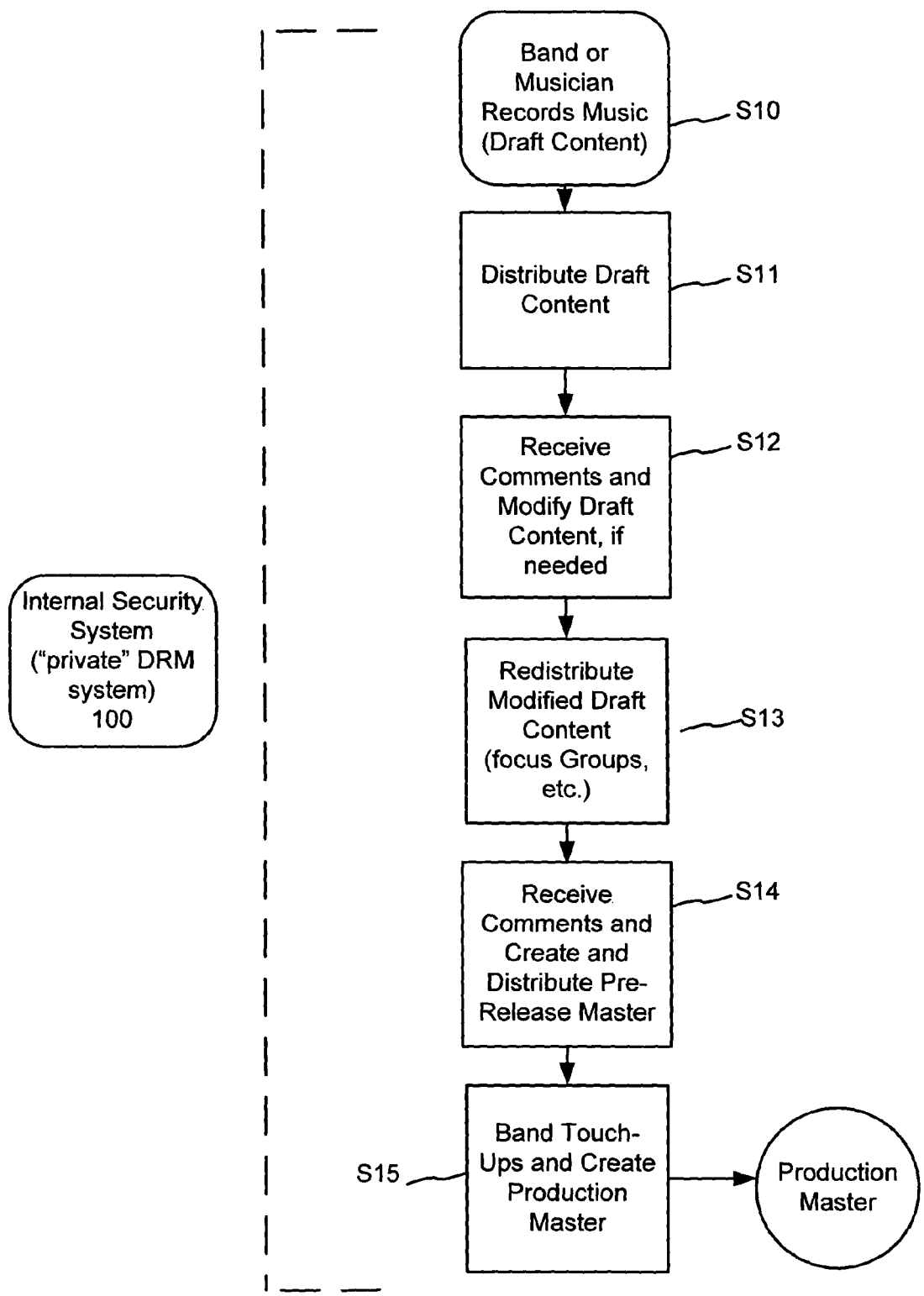
FIG. 10 illustrates a content creation example.

The FIG. 10 process is considered an "internal" or private process in that the music is not released to a wide audience. An internal security system 100, e.g., the SHARE! Media Management and Secure Distribution System provided by InterRoute, can be used to manage and track audio as it is distributed throughout such an internal process. An internal security system is sometimes referred to herein as a "private" (or internal) DRM system, and both terms are used to describe a system used in content creation or limited distribution. A private DRM system may also include or cooperate with a public DRM system, particularly a registration DRM component. Of course, other internal management systems are improved with our techniques, e.g., a process creating pre-release CDs which are then distributed via regular snail mail. Likewise, an Activated Content system can manage and track audio. Such a system can embed a forensic ID that can be used to track a recipient of the audio. The forensic ID can be layered with a DWM Content ID or can be unique per each copy of each song, thus providing both forensic and content identification. Other systems will similarly benefit from our inventive techniques as well.

Figure 11:
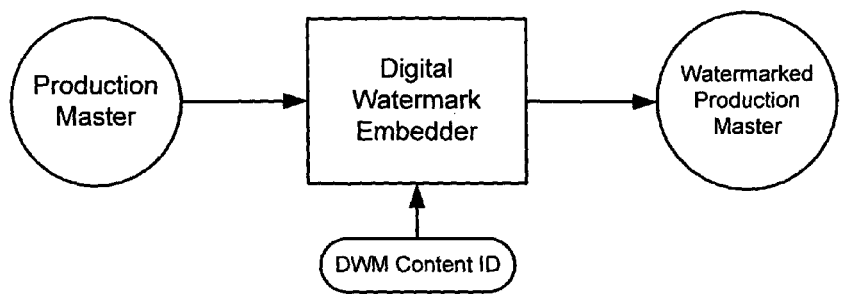
FIG. 11 illustrates digital watermarking a Content Identifier (ID) in a production master.

Production masters are embedded with a digital watermark (FIG. 11). A public DRM system may include or cooperate with a digital watermark embedder to achieve digital watermarking. An embedded digital watermark carries a DWM Content ID, typically a plural-bit identifier that is selected by the digital watermark embedder or assigned by a content owner or DRM system. Glass masters (for disc replication) and digital masters (for electronic downloading) are created from the watermarked production master. (Of course, draft content, e.g., as provided S13, FIG. 10, can also optionally be digitally watermarked with a DWM Content ID, such that the following enhancements are available to draft content as well.) Digital masters are usually DRM-packaged prior to distribution (e.g., creating "DRM-packaged content").

Creating DRM-Packaged Content and Populating Rights Registries

Creating DRM-packaged content (for electronic download or protected CD creation) typically includes determining and assigning Usage Rights to a production master. For example, a DRM-packaged content may be deemed a "play only" version, where copying or redistributing is prohibited. Usage Rights specify these restrictions and may also outline other actions such as render, print, transfer, share, backup, edit, copy count, move, pause (e.g., time shift), usage or licensing fees, etc.

Figure 12:
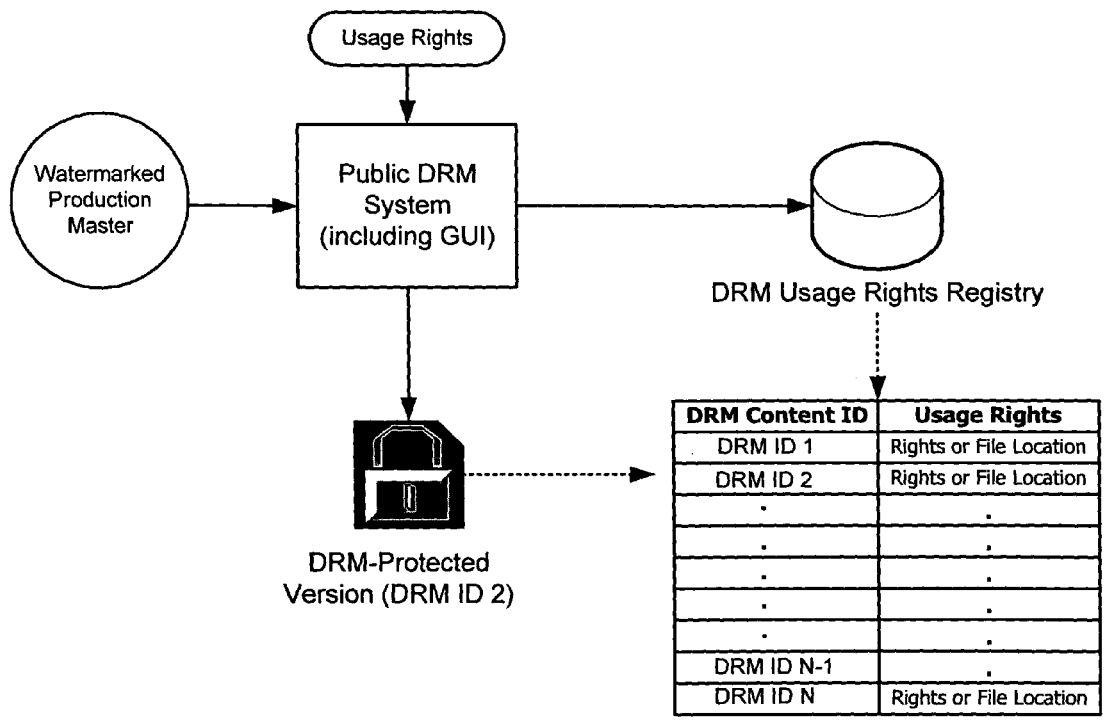
FIG. 12 illustrates DRM packaging and DRM registry population.

With reference to FIG. 12, a content owner (or music label, movie studio, distributor, online music download service, etc.) decides and creates Usage Rights for content (e.g., a watermarked production master). Usage Rights are typically entered into a public DRM system, e.g., a public registration DRM component, via a graphical user interface. One can imagine a GUI that allows a content owner to simply check boxes indicating which rights or combination of rights they wish associated with a particular content item. The registration DRM component typically creates or applies a unique DRM Content ID to the content, e.g., a Uniform Resource Identifier ("URI") as defined by MPEG-21, Part 3, and associates the content with the Usage Rights via the DRM Content ID. The Usage Rights are preferably stored in a DRM Usage Rights Registry according to their corresponding DRM Content ID. The format of Usage Rights can take a variety of forms, e.g., ranging from expression formats like XrML (Extensible rights Markup. Language) or MPEG-21, Part 5, Rights Expression Language (REL) to more simplistic formats that may include predefined text fields, bit values, etc. The public Registration DRM component packages the content (e.g., encrypts the watermarked content, establishes decryption keys and creates authentication data for the Usage Rights, all in a conventional manner). Although not illustrated as such, the DRM Usage Rights Registry may be a component of the public DRM system. A DRM Usage Rights Registry (or "intelligent" copies of such, as discussed above) can also be made available for access by a Media Server. Access can be provided through, e.g., the internet or, if a copy of the registry is made available, the copy can be stored locally with respect to a Media Server. Thus, Usage Rights associated with a DRM-protected version are indexed within a DRM Rights Registry via the DRM Content ID (e.g., DRM ID 2 in FIG. 12).

(Usage Rights are often packaged within a DRM-protected version, e.g., as metadata associated with a content file or DRM container. For example, many of today's music downloads package Usage Rights and a Content Identifier with encrypted music. As alternatives, Usage Rights are provided to a user as a separate file or stored in a data repository, e.g., a Rights Registry, which can be locally or remotely housed. A DRM Content ID is used to associate the file with usage rights. Some simple DRM systems have default Usage Rights for all content in the DRM, where the default Usage Rights can be changed over time.).

Our preferred DRM-protected version now has two Content IDs—a DWM Content ID and a DRM Content ID—associated therewith. But these Content IDs may not always have format compatibility; and typically a DWM Content ID will have fewer bits than a DRM Content ID due to technical differences. Content owners may not be able to juggle or interrelate multiple Rights Registries—one for DRM Content IDs and another for DWM Content IDs. The DWM Content ID may not even match the DRM Content ID used by an associated DRM system. Content owners and/or distributors may even use several different DRM systems when creating DRM-protected versions for download, further complicating the relationship between DWM and DRM Content IDs. Moreover, content is sometimes found outside of a DRM package-rendering a DRM Content ID non-functional in re-associating Usage Rights with the content. Methods and systems are needed to bridge a gap between the two different Content IDs.

One inventive solution involves automatic creation of a digital watermark (DWM) Rights Registry. The DWM Rights Registry includes or links to Usages Rights that are associated with DRM-protected versions.

Figure 13:
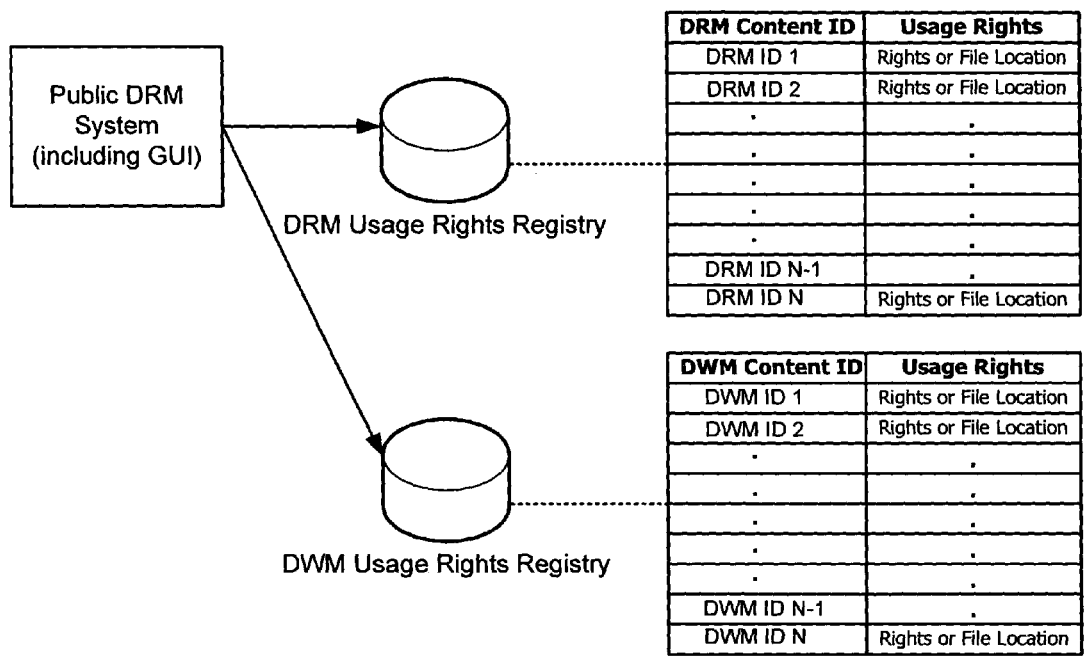
FIG. 13 illustrates a digital watermark (DWM) Rights Registry.

In a first implementation (referred to as "option a") a DRM system (e.g. a public registration DRM component) detects or uses existing knowledge of a DWM Content ID to automatically populate a DWM Usage Rights Registry (FIG. 13). Usage Rights assigned to the DRM-protected content are stored and indexed in the DWM Rights Registry according to some or all of a DWM Content ID. For example, two distinct rights registries are maintained in parallel: a DWM Rights Registry associates DWM Content IDs with Usage Rights, and a DRM Rights Registry associates DRM Content IDs with Usage Rights. This enables Usage Rights lookup using either a DWM content ID or a DRM Content ID as an index or database key. Each time the DRM Rights Registry is updated, e.g., the rights are copied and/or mirrored into the DWM Rights Registry. In some cases (not shown) the DWM Rights Registry includes a DRM System ID, e.g., indicating compatible DRM systems for the Usage Rights.

Figure 14:
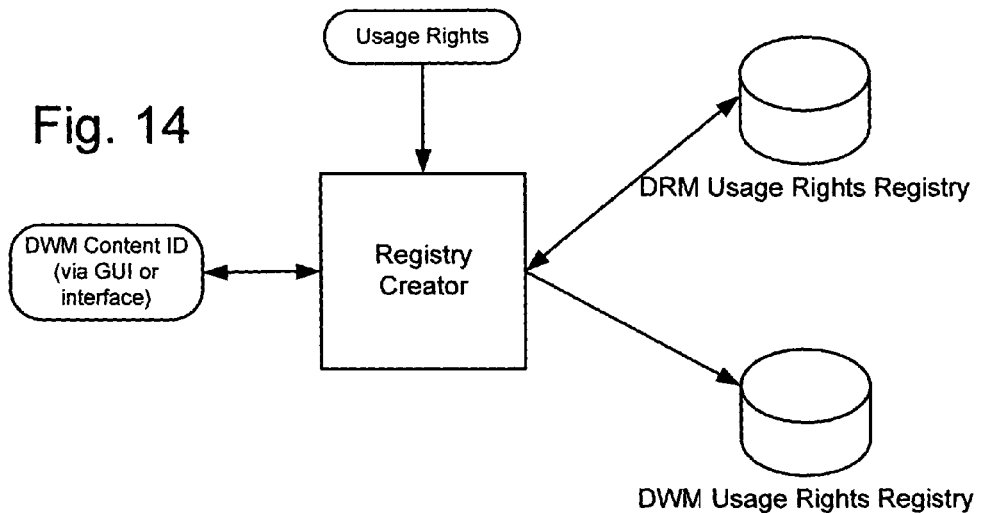
FIG. 14 illustrates a registry creator.

Examples of automatic DWM Rights Registry generation are now provided. A public DRM system may include or cooperate with a registry creator (FIG. 14). The registry creator will typically include software executing within a public DRM system (e.g., the registration DRM component). The registry creator provides or cooperates with a graphical user interface to allow a content owner to enter a DWM Content ID. The registry creator replicates (or copies) some or all of the Usage Rights associated with content into a DWM Rights Registry. The registry creator can access Usage Rights from the DRM Rights Registry or from another source in the DRM system. The Usage Rights are populated in the DWM Rights Registry in accordance with their corresponding DWM Content ID. The Usage Rights in the DWM Rights Registry are preferably a mirror or duplicate of rights found in the DRM Rights Registry.

Figure 15:
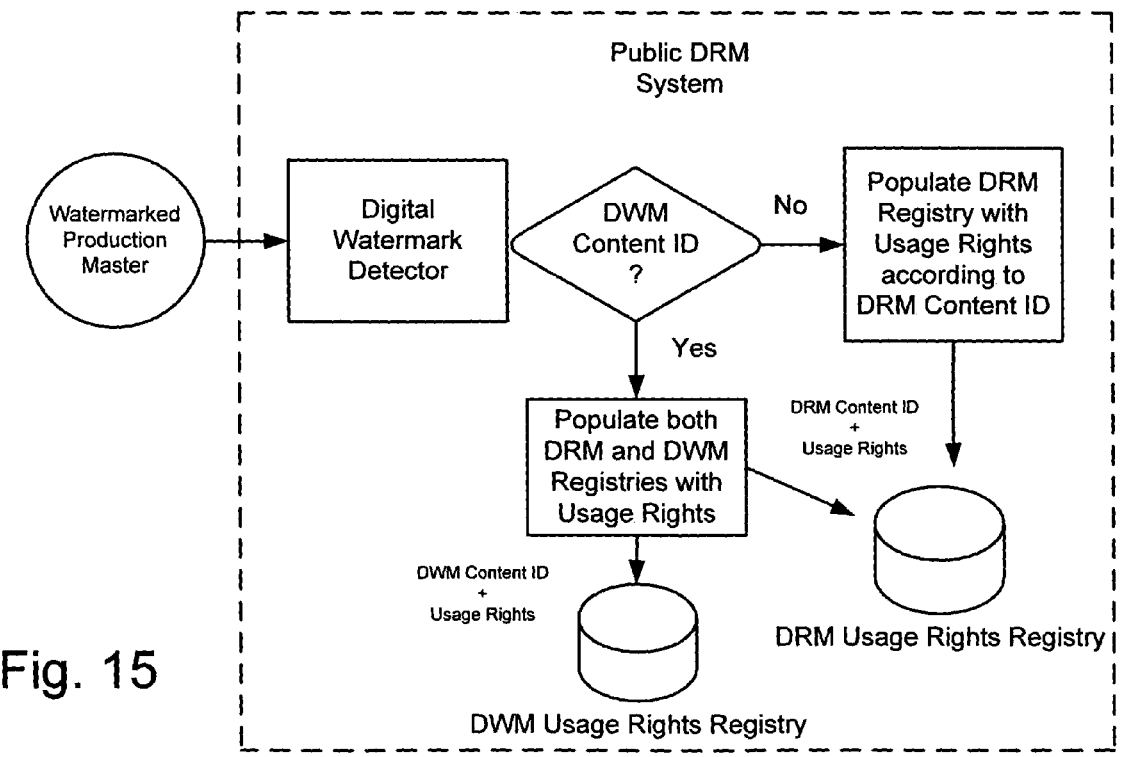
FIG. 15 illustrates a public DRM system including a digital watermark detector.

Another example of automatic generation is a public DRM system that includes or cooperates with a digital watermark detector (FIG. 15). The digital watermark detector sniffs content prior to or during DRM packaging. The DRM system copies Usage Rights associated with the content to a DWM Rights Registry if a DWM Content ID is found by the digital watermark detector. The Usage Rights are preferably populated in the DWM Rights Registry to be indexed according to some or all of the DWM Content ID. As a variation, this public DRM system first populates a DRM Usage Rights Registry and then cues digital watermark detection. A DRM Content ID is used to index Usage Rights in the DRM Rights Registry as discussed above.

In a related example a DRM system is responsible for both digital watermarking and DRM packaging. The DRM system creates or obtains DRM and DWM Content IDs and populates both the DWM Rights Registry and the DRM Rights Registry during content creation or DRM-packaging. Both Registries are automatically populated as Usage Rights are entered for particular content.

Figure 16:
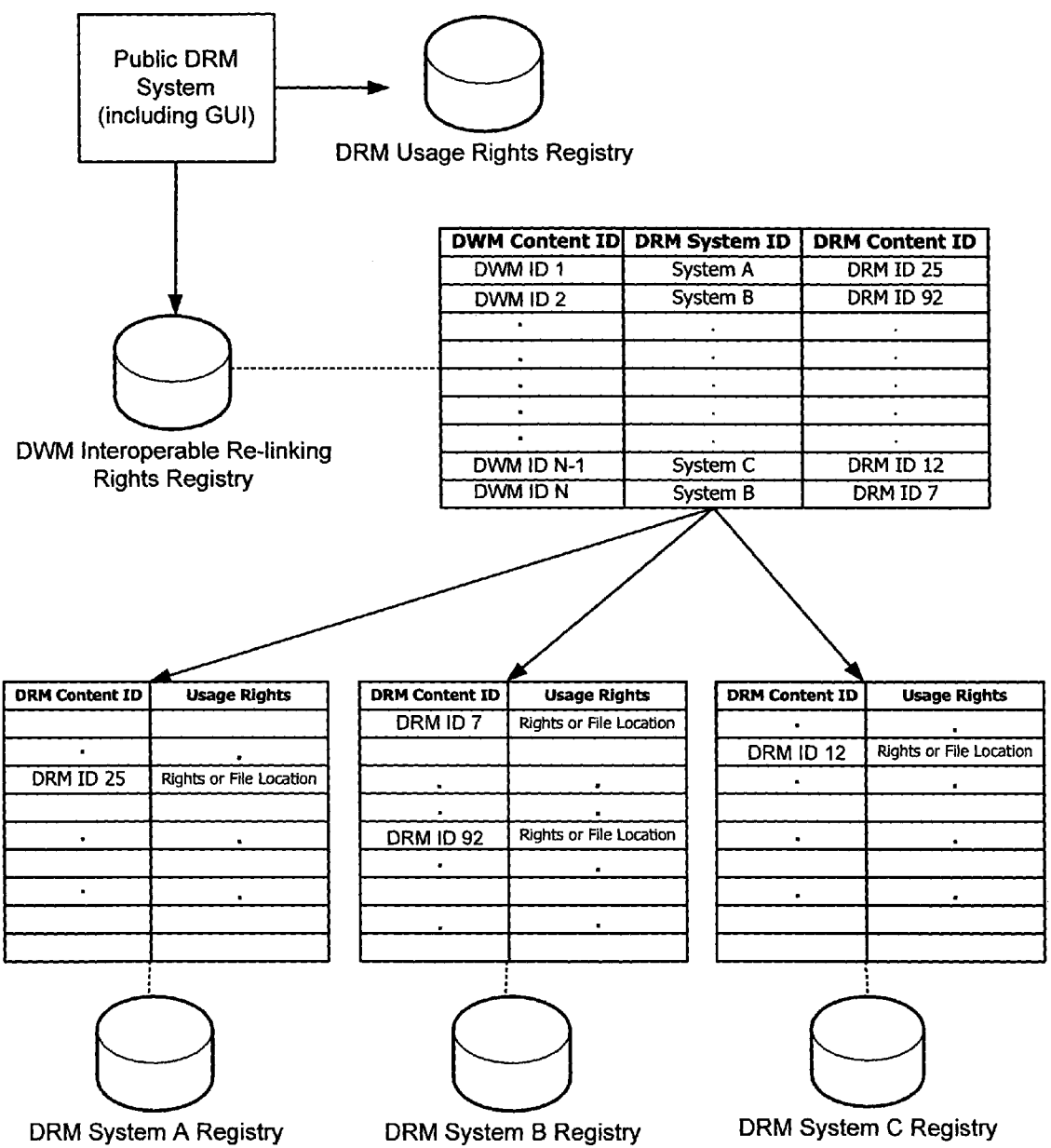
FIG. 16 illustrates another digital watermark (DWM) Rights Registry.

In a second implementation, referred to as "option b," a public DRM system detects, receives or uses existing knowledge of a DWM Content ID to automatically create a DWM "interoperable re-link" registry (FIG. 16). The interoperable re-linking registry associates DWM Content IDs with corresponding DRM Content IDs. A Media Server presents a DWM Content ID to interrogate the re-linking registry in hopes of obtaining a DRM Content ID and DRM System ID. The DRM System ID is used to identify a particular registry associated with the DRM System ID. The DRM System ID also indicates which type of client DRM system is residing on the Media Server. A DRM Content ID, once obtained, is used to link to a corresponding system Rights Registry entry to obtain Usage Rights associated with related content. Multiple different system registries, each associated with a particular DRM System ID (e.g., System A, B or C), can be maintained. In other implementations only one DRM Rights Registry is maintained, but the Rights Registry includes different versions of Usage Rights each formatted according to different DRM system types. Both the DRM Content ID and the DRM System ID are presented to obtain properly formatted Usage Rights. (A content owner (or consultant, distributor or vendor) who enters content into a DRM system can also enter a DWM Content ID such that the databases for options a and b are automatically created. Alternatively, a DRM system can detect a DWM Content ID and create databases for options a and b without an internal security system to coordinate the database creation.)

Handling Raw, but Protected Content

DRM-packaged content is provided for distribution, e.g., downloading from an on-line music store to one or more Media Servers. Content is played, rendered and handled, all according to associated Usage Rights. But sometime this isn't always possible. Sometimes DRM-protected content finds itself outside of its DRM packaging—becoming "raw content." Raw content is defined as digital, base band or compressed content that is not encrypted or DRM-packaged. Raw content can be found on a Media Server from capturing a digital buffer, hacking a link encryption, hacking DRM encryption, re-digitizing an analog output, downloading files from a Peer-to-Peer (P2P) network, ripping CDs, and using DeCSS to rip DVDs, etc.

Figure 17A:
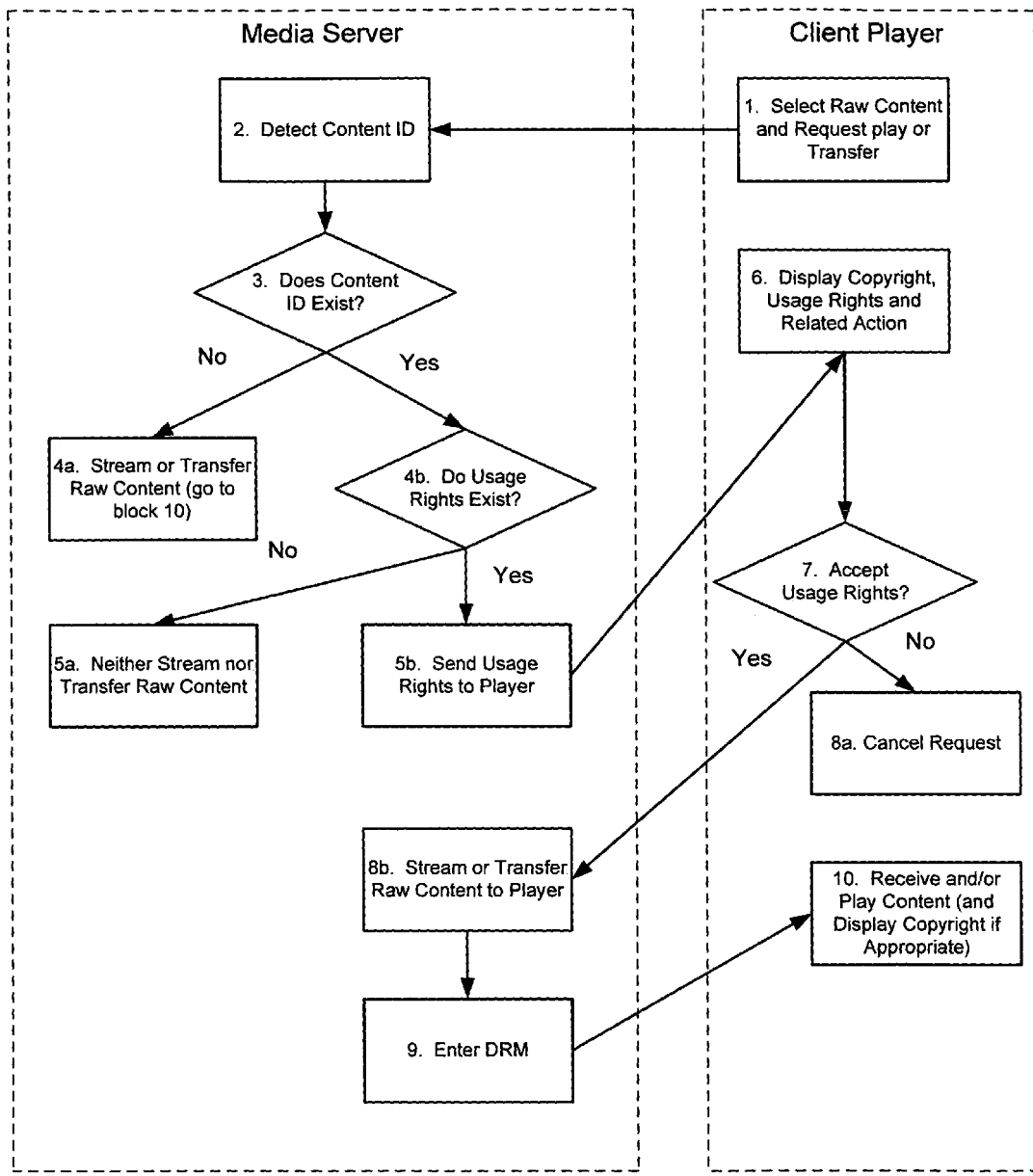
FIG. 17a illustrates a process to detect and respect a DWM Content ID in a Media Server.

FIG. 17a illustrates a process to handle "raw content" on a Media Server. The FIG. 17a process is preferably invoked when raw content is accessed or found by a Media Server or Client Player Application. The term "accessed" is used in a broad sense and may include, e.g., encountering, rendering, playing or transferring control of the raw content from the Media Server to the Client Player Application. Access may also imply transferring raw content between a first Media Server and a second Media Server. (A Media Server preferably cannot play content without accessing a Client Player Application as defined above. Recall, as discussed above by way of example, a PC including jukebox software functions as both a Media Server and Client Player Application.)

A user selects raw content for playing. The Client Player Application prompts the Media Server to detect a DWM Content ID (or control is assumed by the Media Server upon receiving a request to access raw content).

Figure 18:
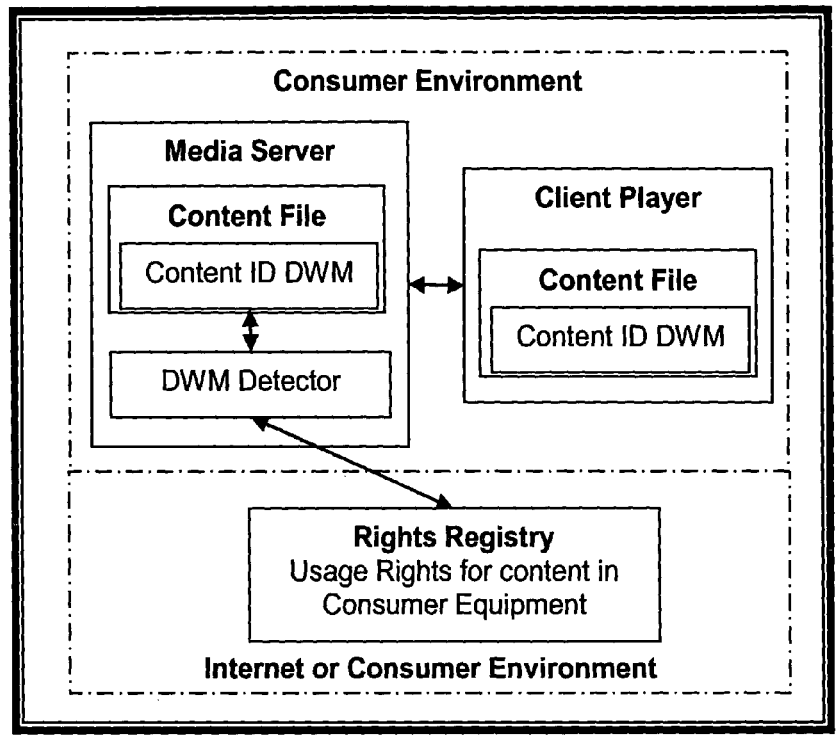
FIG. 18 illustrates some architectural elements of a Media Server.

The Media Server includes a digital watermark detector (FIG. 18). The digital watermark detector searches raw content for a DWM Content ID embedded therein. In some implementations the digital watermark detector operates in a background mode, sifting through raw content as it enters a Media Server. Detected DWM Content IDs are stored for later use when called for in the FIG. 18 process. One can imagine an environment presented in a file sharing network or TiVo®, where a device is sifting through piles of content in search of content it thinks a user will enjoy. The user may not even know that the device is doing so. In other implementations, the digital watermark detector lies dormant until called by the Media Server, usually in response to a request to access content from a Client Player Application.

The Media Server enables the Client Player Application to perform the requested action if a DWM Content ID is not found (FIG. 17a). If the DWM Content ID is found, however, the Media Server preferably checks for associated Usage Rights. For example, the Media Server interrogates a DWM or re-linking Rights Registry with the DWM Content ID to determine whether there are any associated Usage Rights (FIG. 18). A DWM or re-linking Rights Registry can be stored locally on the Media Server, but will often be accessible online. If the Usage Rights do not exist, the Media Server preferably prevents access to the content. A message can be displayed to the user indicating an inability to perform the requested action. If the Usage Rights do exist, the Media Server preferably obtains the Usage Rights from the DWM or re-linking Rights Registry and communicates Usage Rights information to the Client Player Application for display. The user can accept or reject the Usage Rights. Acceptance may require a license, payment or negotiation with a Rights Registry or an on-line media store. If the user does not accept the Usage Rights, the Client Player Application preferably prohibits access and notifies the user. If the user accepts the Usage Rights, the content is played or transferred under the direction of a public DRM system (e.g., a client DRM system) residing on the Media Server. Block 9 ("Enter DRM") in FIG. 17a represents control by the client DRM system of the raw content according to the Usage Rights, but may also represent a "repackaging" or re-associating of the raw content and Usage Rights in DRM-packaging by the client DRM system.

Figure 17B:
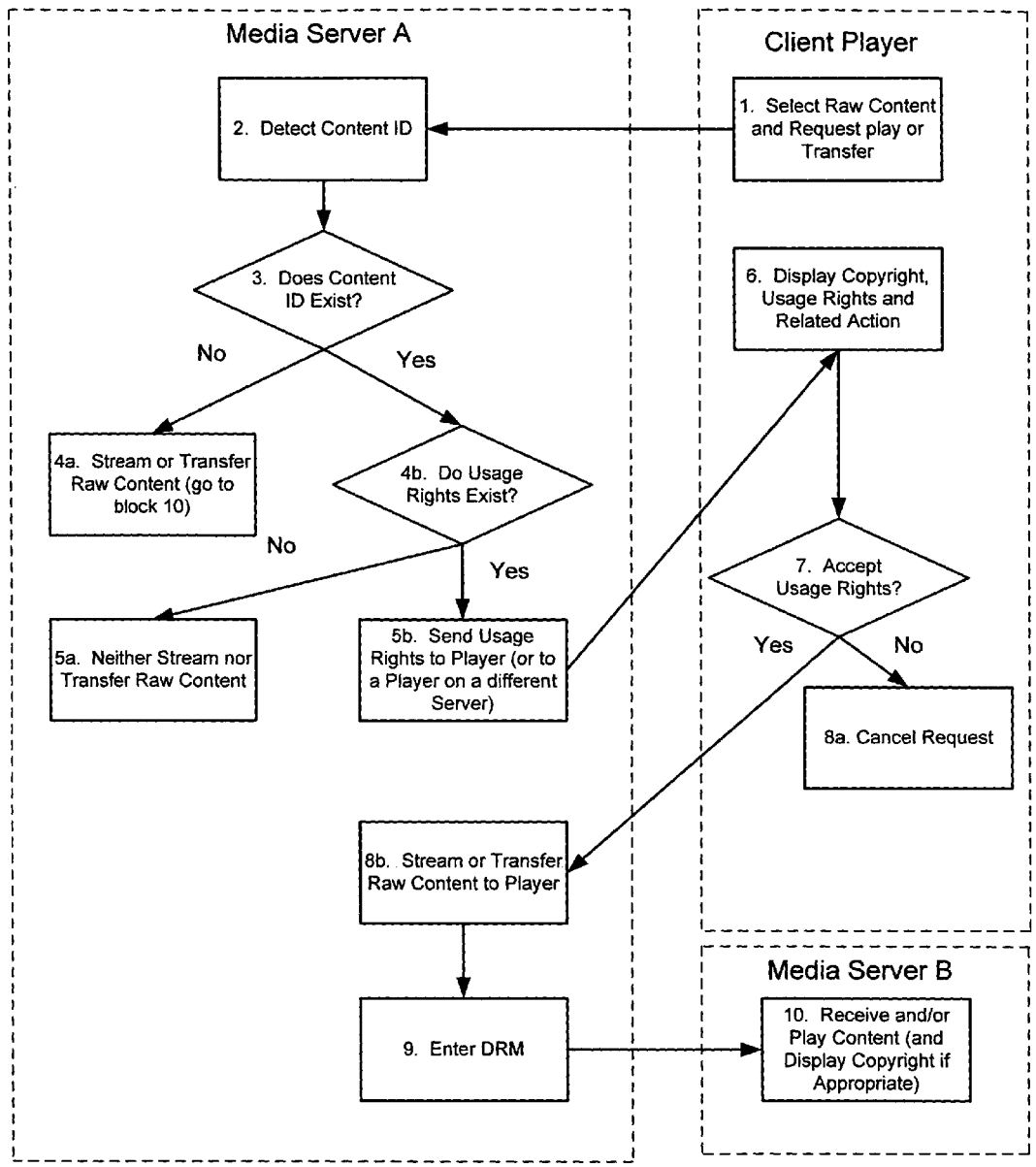
FIG. 17b illustrates a process to detect and respect a DWM Content ID in a Media Server for Media Server to Media Server content transfers.

FIG. 17b illustrates a similar process, but handles a requested action of transferring content between a first Media Server (A) and a second Media Server (B).

Figure 17C:
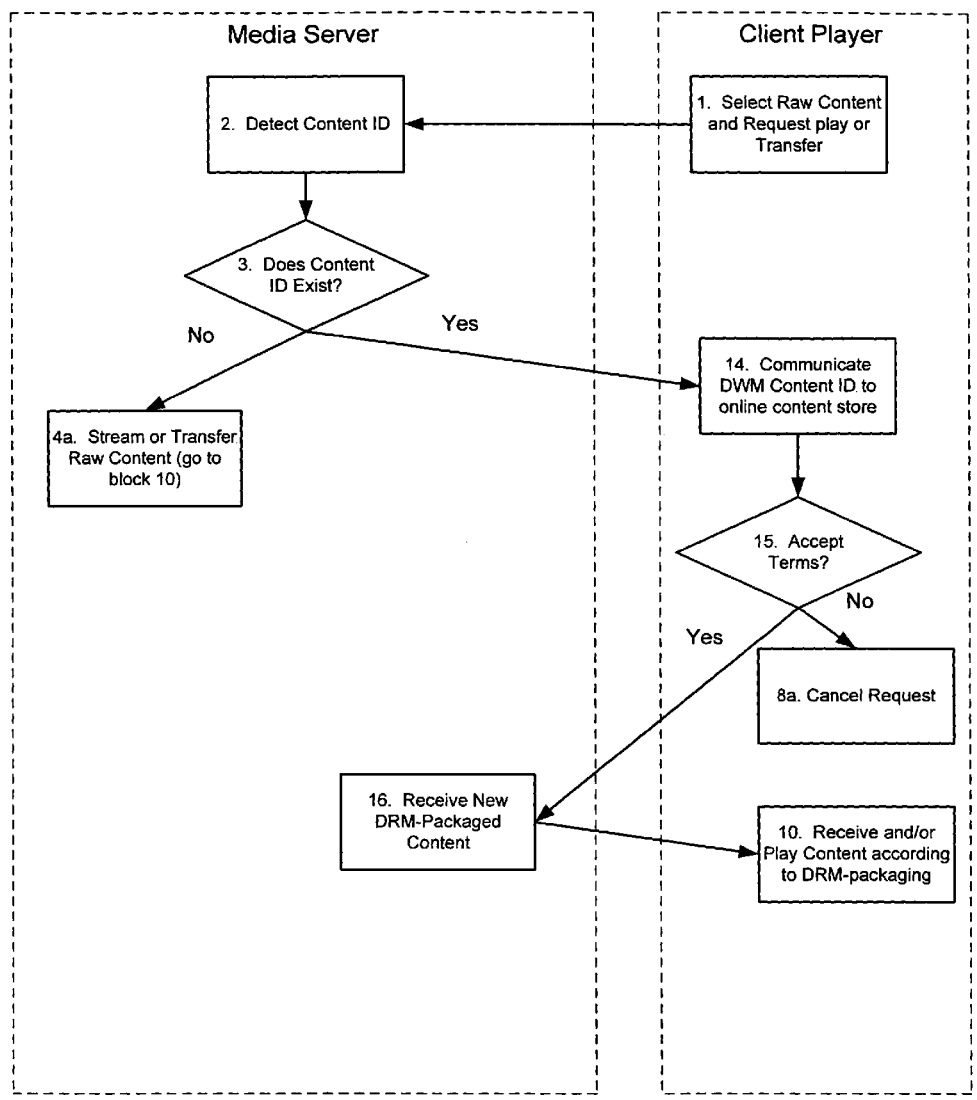
FIG. 17c illustrates a process to detect a DWM Content ID and link to an online content store or distributor from a Media Server.

Another approach is illustrated with respect to FIG. 17c. Upon encountering raw content (e.g., a request to access the raw content or during a background process), a Media Server searches the raw content for digital watermarking. The Media Server (e.g., the Client Player Application) initiates communication with an online content store (e.g., think iTunes®) and provides the DWM Content ID to the online store. The online store uses the DWM Content ID to interrogate a DWM database (e.g., a database associating DWM Content IDs with respective content files and/or options). The online store presents the Media Server with options, e.g., would a user like to purchase music or video associated with the DWM Content ID, perhaps at a discounted rate. The Media Server/User will typically maintain an account with the online store to allow a one click purchase. (Other options presented by an online content store may include display of related content, e.g., songs by the same band or movies staring the same actors, etc. A user can select from the related content for purchase. Another option presents copyright information to the user and encourages them to purchase the content.) When purchased, a new DRM-packaged version is sent to the Media Sever (e.g., via an interface with the Client Player Application) to replace the raw content version. The new DRM packaged version is rendered or played according to its Usage Rights. (The Media Server can automatically delete the raw content or query the user whether they wish to delete the raw content.) We note that the newly presented DRM-packaged version can include content that is tied to the Media Server. For example, a forensic digital watermark is embedded in the content to identify a recipient, such as a user or Media Server.

A Media Server can determine which online content store to link to by, e.g., allowing a user to set a default (or preferred) online content store in a "preference" setting of a Client Player Application, much like setting a preferred home page on an internet browser. The Media Server will link to a preferred online music store, e.g., in the FIG. 17c. implementation. (Instead of allowing a user to select an online music store, a Media Server may default to a related online content store that is associated with the Media Server. An address for an online content store is programmed into the Media Server prior to its distribution or during a registration process.) In a related implementation a Rights Registry or similar database has information regarding an online content store that an original content item (e.g., a song or movie) was purchased from and links a Media Server to that online store. Much like above, a Media Server communicates an encountered DWM Content ID to a Rights Registry or re-linking registry. The Registry includes an online address that is communicated back to the Media Sever. The Media Server uses the address to communicate with the online content store. In this case a DWM Content ID may be unique for each song and online content store, or a content item is re-watermarked or additionally watermarked to include a DWM layer (additional watermark or additional payload bits) that identifies the online content store.

A DWM Content ID is also useful in an online content store registration context. Some online content stores may offer to catalog content (e.g., music) on a user's computer or media server. They do so in hopes of identifying other content that might be appealing to a user (e.g., songs by the same artist or popular songs in a preferred genre, etc.). For example, the user may be a huge country music fan, but really prefers classic country over today's popish-country sound. The online content store determines this preference by extracting and analyzing, e.g., content identifier stored in headers on a user's computer. If a content store finds "raw content" it employs a digital watermark reader to detect a digital watermark embedded with the raw content. The digital watermark carries a DWM Content ID. The DWM Content ID is used by the online store (e.g., provided to a registry or database) to identify the raw content and provide options, e.g., songs from the same album that the user doesn't have, other songs that might be enjoyed by the user if she likes this song, etc. (The online content store may also offer the user an opportunity to purchase the content, perhaps at a discounted rate. Or the online content store may simply offer to repackage or replace the content with a DRM-packaged version for free, under the assumption that it will prevent piracy.) We also realize that some music will be ripped from a user's CDs. One way to indicate such is to embed a "ripped" watermark flag when ripping content. This flag can tell, e.g., the online content store, that the music is legitimate, particularly is the flag is associated with the user.

Figure 17D:
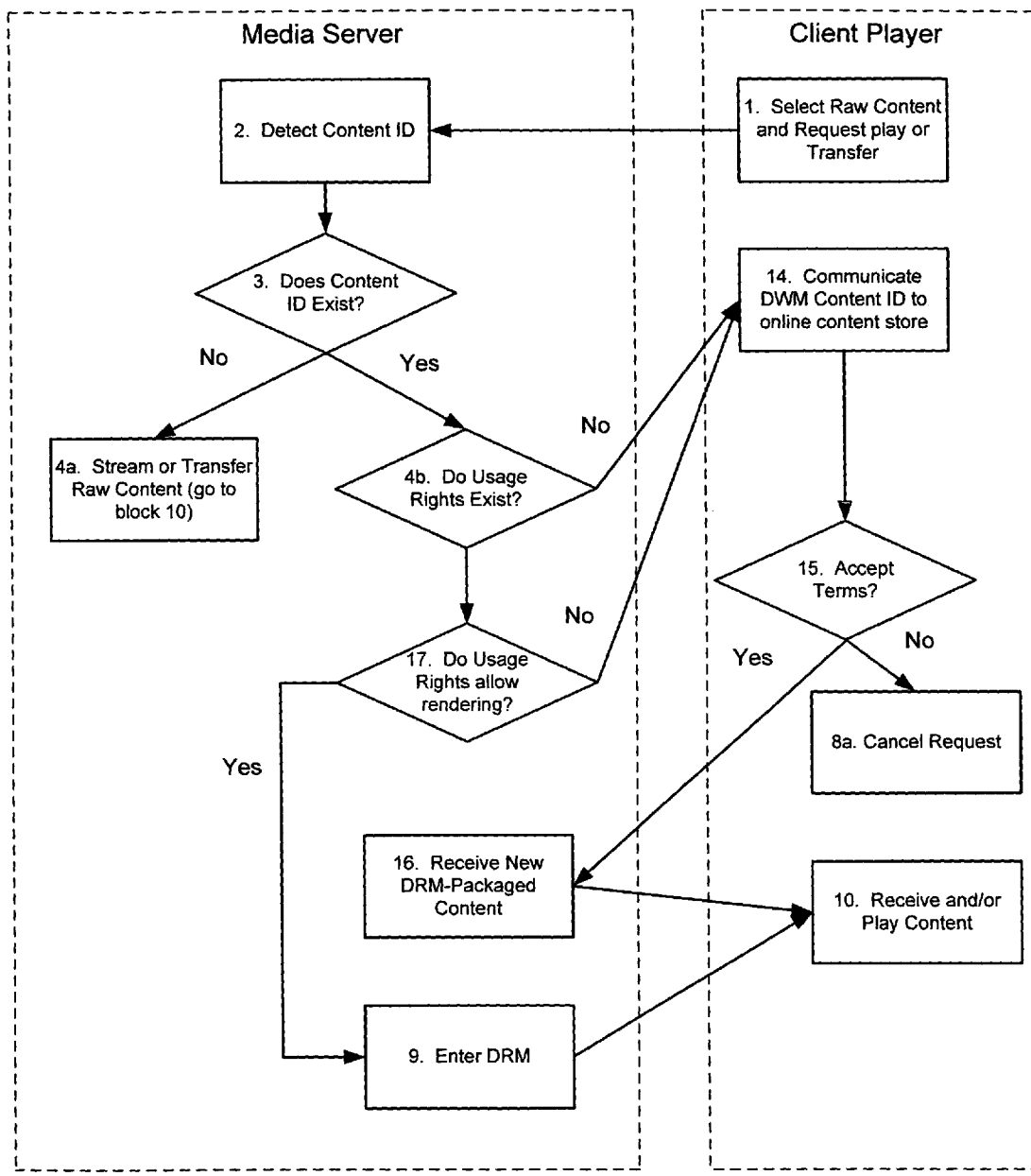
FIG. 17d illustrates another process to detect a DWM Content ID and link to an online content store or distributor from a Media Server.
Figure 17E:
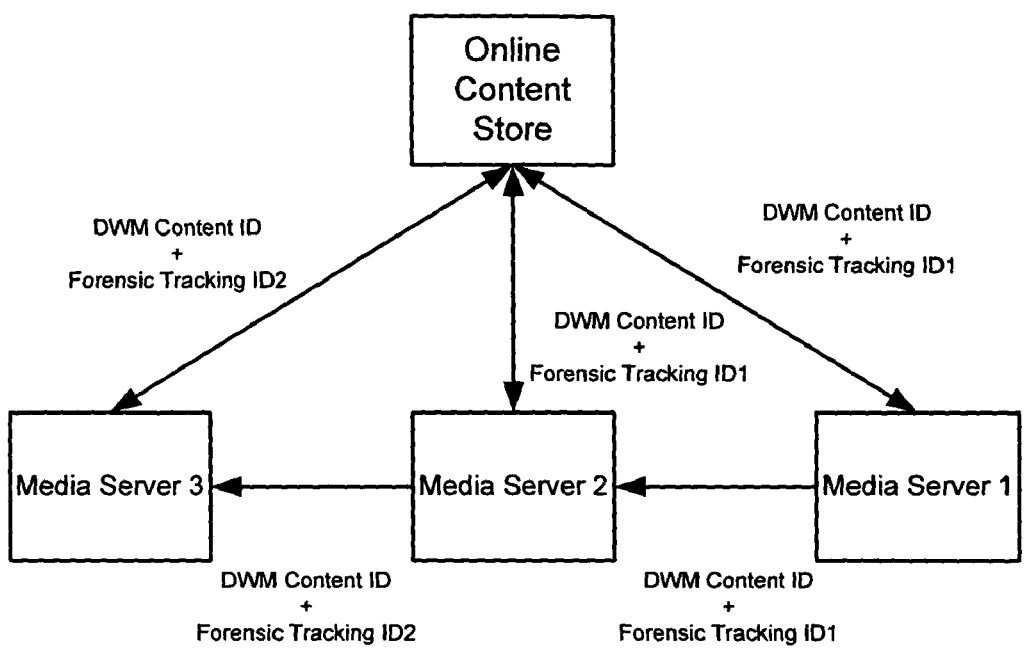
FIG. 17e illustrates commmunication with an online content store.

The FIG. 17d implementation is similar to that discussed with reference to FIG. 17e but additionally queries a DRM or re-linking Rights Registry to determine whether there are any Usage Rights associated with the DWM Content ID. The Usage Rights might allow, e.g., repackaging and playing. If not, the Media Server is directed to an online content store as discussed above with respect to FIG. 17c.

Yet another implementation is described with reference to FIG. 17e. A first Media Server 1 receives DRM-packaged content from an online content store. The content has been digital watermarked to include a DWM Content ID and a forensic tracking ID1. The forensic tracking ID1 is uniquely associated with a recipient like a user or Media Server 1. The DRM-packaged content is converted to raw content (e.g., as discussed above) and the raw content is communicated to a second Media Server 2. The raw content still includes the DWM Content ID and the forensic tracking ID1 steganographically embedded therein. Media Server 2 detects the digital watermarking in the raw content and recovers the DWM Content ID and the forensic tracking ID1. Media Server 2 recognizes that the forensic tracking ID1 does not belong to Media Server 2. Several options are available:

The Media Server 2 allows playing of the raw content, but offers its user an opportunity to purchase the content through communicating the DWM Content ID to the online content store. If a purchase is made a newly DRM-packaged version is sent to Media Server 2. A user interface may query the user if they wish to permanently delete the raw content. (Deleting raw content can also be automated upon receipt of newly DRM-packaged content.)

The Media Server 2 allows playing of the raw content and communicates the DWM Content ID and forensic tracking ID1 to the online content store. The online music store uses the DWM Content ID to locate other selections that might be interesting to the user. For example, the other selections might be other songs by the same artist or other movies staring the same actors. (The raw content becomes a mechanism to enhance sales. Thus, potential lost revenue from the raw content on the second Media Server 2 facilitates additional revenue.) The forensic tracking ID1 can be monitored (e.g., how many times has the online music store seen this ID) and different options can be presented according to the occurrence or frequency.

The Media Server 2 embeds another watermarking signal in the content, or slightly adjusts the forensic marking (now forensic tracking ID2). The new or adjusted watermarking indicates that redistribution is prohibited.

Of course, these three options can be used in combination with one another.

Let's consider the third option in more detail. Media Server 2 communicates the raw content to Media Server 3. Media Server 3 detects the digital watermarking and recovers the forensic tracking ID2. The forensic tracking ID2 indicates that further distribution or rendering is not permitted. Media Server 3 preferably blocks rendering of the raw content, but can link to the online content store to purchase new content via the DWM Content ID or to obtain associated Usage Rights. (While we have illustrated only a couple of hops in this FIG. 17e example, many more can be added. For example, forensic tracking identifiers can be incremented several more times before redistribution is prohibited.).

With reference to FIG. 18, a DWM Rights Registry may reside either in the Consumer Environment and/or in a remote location accessible from the Media Server, such as the Internet or home computer network. A DWM Content ID can either be (1) provided to a DWM Rights Registry, which may be a duplicate or mirror of one or more DRM Rights Registries (e.g., "option a" discussed above), or (2) provided to a DWM interoperable re-linking Rights Registry, where the Media Server is redirected to a DRM Rights Registry (e.g., "option b" discussed above). The interested reader is referred to assignee's U.S. patent application Ser. No. 09/571,422, filed May 15, 2000, which is hereby incorporated by reference, for even further details on watermark-based linking. Regardless of which option is used, Usage Rights are provided from a Rights Registry to the Media Server, e.g., as an XrML file, MPEG-21 REL file, etc. Communication with the Rights Registry is preferably protected over a secure authenticated path. In some cases we use content encryption and authentication or link encryption when communicating Usage Rights. The Usage Rights are used by a public DRM system (e.g., a client DRM system) to regulate access and rendering of raw content.

Hierarchical Approach

The FIG. 17a process can be augmented to provide a hierarchical approach to handle raw content including expected data like CCI bits. CCI bits are carried by digital header or footer data, vertical blanking intervals (e.g., analog header or footer data) and even digital watermarking. In the case of digital watermarking, CCI bits may be carried through a different watermark than one which carries a DWM Content ID. Our preferred hierarchical approach controls a Media Server to first try detecting a DWM Content ID to link to Usage Rights, and then, if the DWM Content ID or Usage Rights do not exist, controls the Media Server to look for CCI bits. If any CCI bits are found the Media Server respects any control information.

Figure 19:
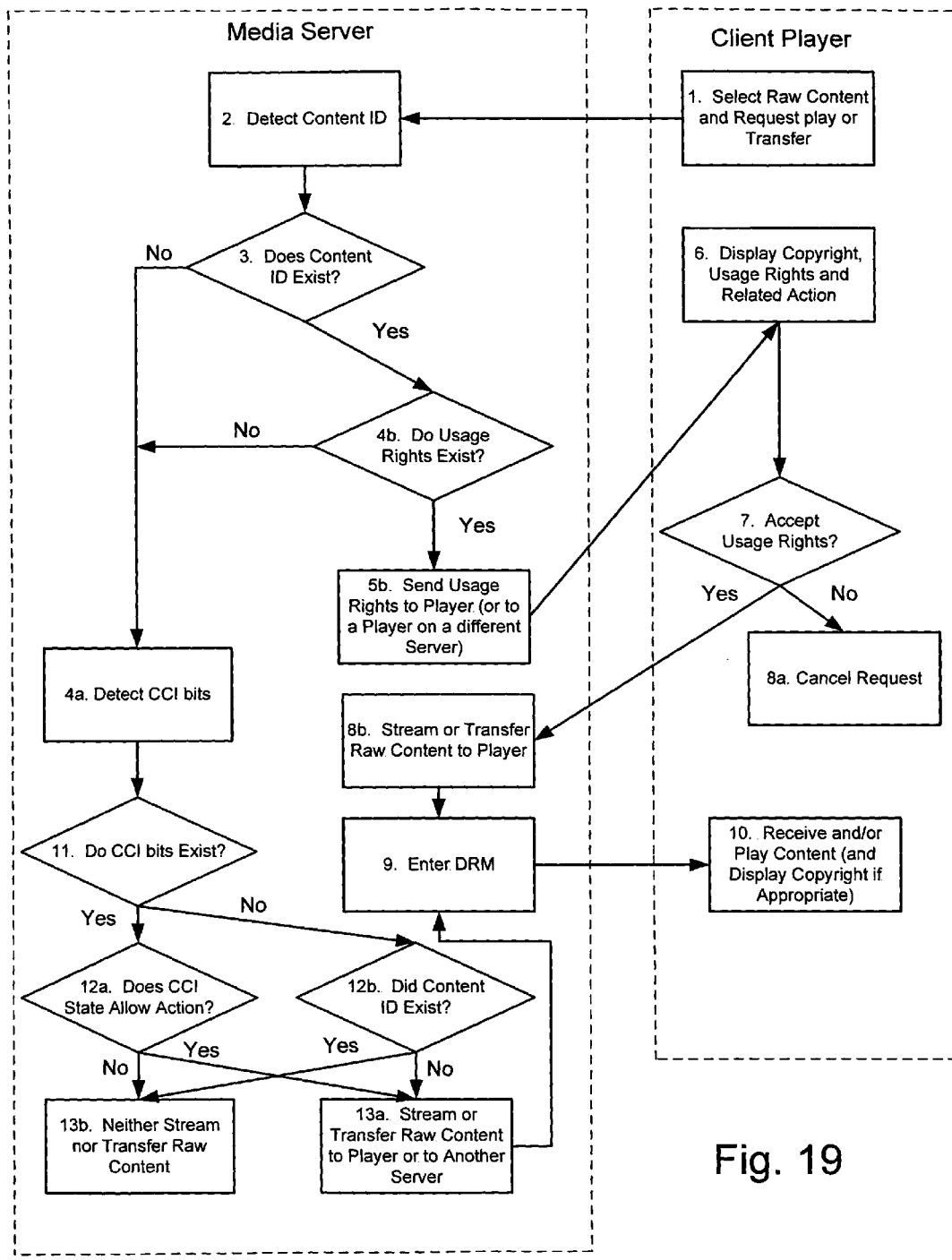
FIG. 19 illustrates a hierarchical process to handle content including both copy control information (CCI) and embedded DWM Content Identifiers (ID).

Even further details are illustrated in FIG. 19. If a DWM Content ID and Usage Rights exist, the process is unchanged with respect to FIG. 17a. However, if either the DWM Content ID or Usage Rights do not exist, CCI bits are detected and respected. A Media Server looks for CCI bits (e.g., reads a vertical blanking interval, header, digital watermark, etc.). If the CCI bits and DWM Content ID do not exist, the Media Server can perform the requested action. If the CCI bits do not exist, but the Content ID exists (with no Usage Rights), the action is preferably canceled. If the CCI bits exist, the Media Server preferably respects any copy control state. Specifically, if the content is copy never or copy no more, the content is neither be streamed nor transferred. If the content is copy once, it can be streamed, and, if transferred, one or both copies should be marked as copy no more. If the content is copy freely, it can be streamed or transferred. Finally, if the content is no redistribution, it can be streamed and copied if the Client Player Application is within the Consumer Environment, but neither streamed nor transferred outside the Consumer Environment.

Re-Associating Usage Rights

Figure 20:
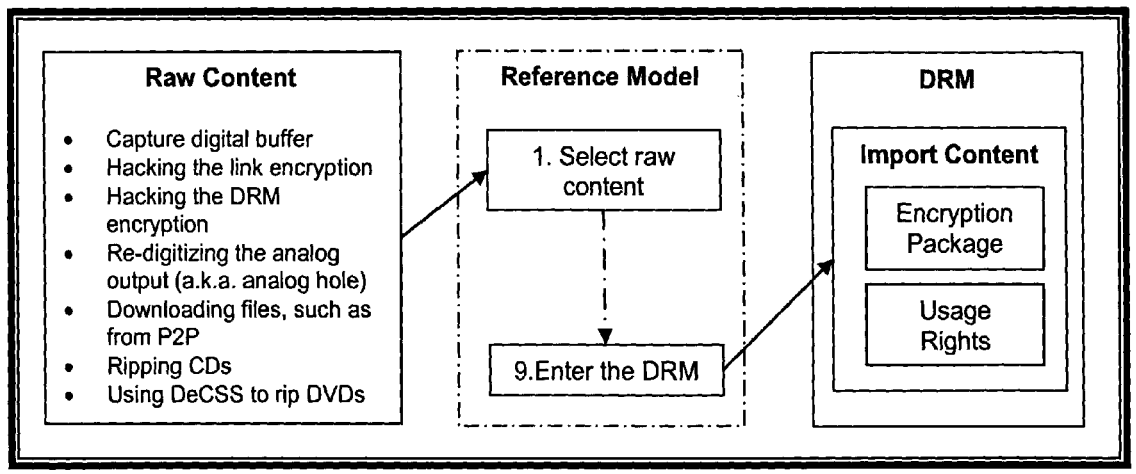
FIG. 20 illustrates a process to repackage raw content.

FIG. 20 provides further details on utilizing a public DRM system as discussed in FIGS. 17a and 17b. Raw content is handled according to FIGS. 17a or 17b (e.g., the "reference model" block in FIG. 20). A DWM Content ID links to Usage Rights as discussed. The Usage Rights and content are provided to the public DRM system, which uses the Usage Rights to dictate repackaging of the raw content. The DWM Content ID provides an interoperable identification as content moves between DRM systems and Media Severs. Thus, content can be re-encrypted into a proper encryption package and linked to Usage Rights for control by a DRM system.

Interoperable DRM

Figure 21:
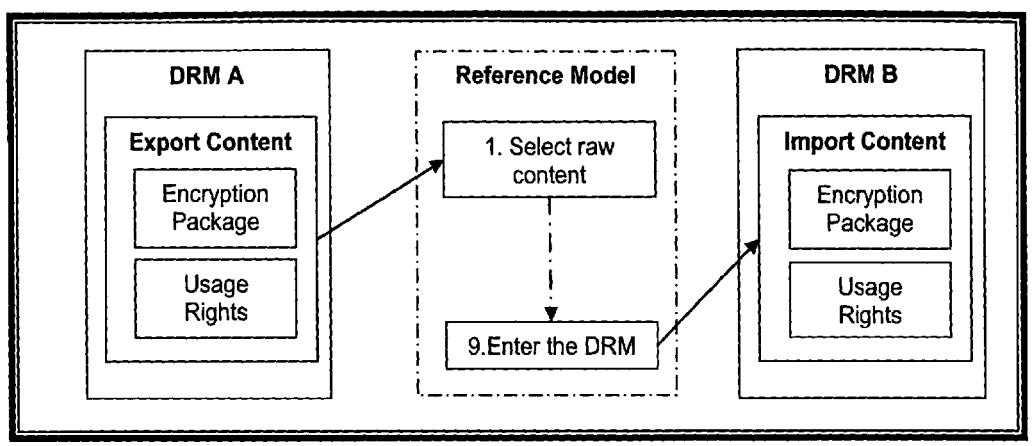
FIG. 21 illustrates a process to transport content from a first DRM system to second, different DRM system.

A DWM Content ID also facilitates transfer of content between different (and otherwise incompatible) DRM systems, e.g., creating an interoperable DRM system. A first DRM system (DRM-A) exports DRM-protected content as raw content (FIG. 21). The FIG. 17a or 17b process identifies the raw content via an embedded DWM Content ID and links to associated Usage Rights. The raw content is preferably shielded from user access, e.g., through link or keyed encryption or involving a hidden process (e.g., a secure authenticated channel). A user or hacker will have little access to the raw content during DRM transformation. A Usage Rights format for a second DRM system (DRM-B) is determined. Usage Rights for the second DRM system are obtained from a Rights Registry and are provided to the second DRM system for repackaging. There are a number of ways to indicate a format of a second DRM system to a Rights Registry. A Media Server may communicate a DRM type identifier (e.g., a few bits) along with the DWM Content ID, which indicate the type of DRM system. Or the Media Server may link to a default Rights Registry that is formatted according to the second DRM system. Additional Options for converting DRM-protected content from DRM A to DRM B are discussed below:

1. DRM A includes information to allow conversion to DRM B's Usage Rights format. The converted Usage Rights are provided to the DRM B along with raw content. Conversion information can be obtained from a database or style-sheet like table.
2. DRM A converts Usage Rules to a universal format. The universal format and raw content are communicated to the DRM B. The DRM B uses the universal format of the Usage Rights to transfer into a format used by the DRM B system.
3. DRM A communicates a DWM Content ID to the DRM B system. The DRM B system communicates with an online content store or other content repository to obtain a new DRM-packaged version which is compatible with DRM B.
4. DRM A communicates a DWM Content ID and the DRM A-packaged content to DRM B. The DWM Content ID includes or has appended thereto information pertaining to DRM A. This watermark information is used to prompt a software upgrade of the DRM B system. That is, the very presence of this watermark information prompts DRM B system to seek to upgrade its software. The upgrade preferably includes the ability to handle, render or transform DRM A packaged content. The upgrade may include installing a software module that cooperates with DRM B to handle the encrypted content.

Of course, a Media Server can facilitate communication for a particular DRM system.

Usage Scenarios

A few additional usage scenarios are helpful to even further describe Usage Rights compatibility.

A first scenario involves detection of a DWM Content ID by the FIG. 17a, 17b or 19 systems. A DWM Content ID is securely communicated to a DWM Rights Registry shown in FIG. 18. Usage Rights are communicated to the Media Server from the Rights Registry. A Media Server DRM system is compatible with the Usage Rights and uses the Usage Rights to regulate access to corresponding raw content, all as discussed above.

A second scenario involves a non-compatible DRM system residing on a Media Server. For example, Usage Rights in a Rights Registry may be formatted for a first DRM system, but the DRM system on the Media Server is a second type of DRM system. The Rights Registry may recognize the incompatibility, e.g., from inspection of optional bits appended to the DWM Content ID that identify the Media Server's DRM system. The Rights Registry may communicate the incompatibility to the Media Server, which forecloses playing the content. (Alternatively, instead of the Rights Registry noticing an incompatibility, Usage Rights are communicated to the Media Server, and the DRM system determines the incompatibility.).

Figure 22A:
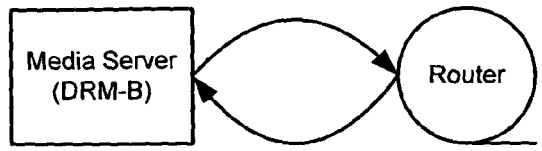
FIGS. 22a-22d illustrate communication routes to receive compatible Usage Rights.

A better approach directly addresses Usage Rights/DRM system incompatibility. Enter a third usage scenario: A DWM Content ID links to a Rights Registry. The Rights Registry or Media Server determines that the Usage Rights are incompatible with a DRM system residing on the Media Server. The Media Server receives the Usage Rights and transforms (or converts) them into a format that the DRM system can interpret. In one implementation a DWM detector or DRM system converts Usage Rights (in comparison to a system where a DWM Rights Registry includes the Usage Rights, e.g., option a). The Media Server's DRM system uses transformed Usage Rights to control content. Usage Rights transformation is achieved, e.g., through the FIG. 20 DRM interoperable transformation system. Alternatively, instead of receiving incompatible Usage Rights, a Rights Registry can redirect the Media Server to a Rights Registry including rights formatted in a compatible manner. The Media Server communicates a DRM system ID and a Rights Registry redirects the Media Server to a DRM Registry including properly formatted Usage Rights. (Or the Media Server may simply default to a Registry that is compatible with its DRM system.). Consider a few additional examples:

A Media Server (or its client DRM component) communicates with a Router or Rights Registry (FIG. 22a). The communication includes a DRM system ID (DRM-B) and a DWM Content ID. The router is intelligent, meaning that it is able to obtain, create or provide Usage Rights that are compatible with DRM-B. Compatible Usage Rights are sent to the Media Server.

Figure 22B:
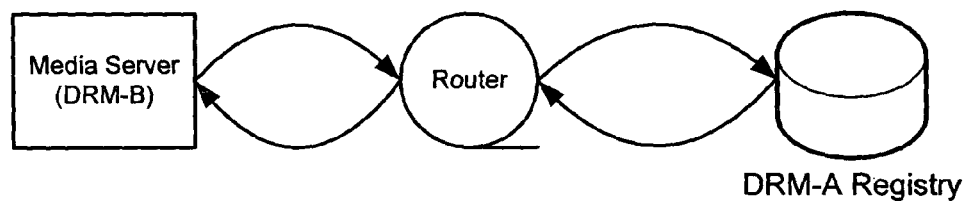

With reference to FIG. 22b, a Media Server communicates a DWM Content ID and DRM system ID (DRM-B) to a router (e.g., a Rights Registry). In the registry, the DWM Content ID is associated with DRM system type A (DRM-A), which is not compatible with DRM-B. The router communicates the DWM Content ID and DRM system ID (DRM-B) to a registry associated with DRM-A. (An address or link for DRM-A is stored in the Rights Registry.) The DRM-A system registry is intelligent, meaning that it is able to obtain, create or provide Usage Rights that are compatible with DRM-B (e.g., such as using DRM-A to DRM-B options 1 or 2, as discussed above). Compatible Usage Rights are identified with the DWM Content ID and are sent from DRM-A registry back to the router for communication to the Media Server. The DRM-A may have a universal Usage Rights format that allows it to map Usage Rights associated with the DWM Content ID into a DRM-B format (e.g., DRM-A to DRM-B option 1, discussed above). Or the DRM-A uses an interoperable reference model to transform the Usage Rights from DRM-A to DRM-B, etc. (e.g., DRM-A to DRM-B options 2, 3 or 4, discussed above)

Figure 22C:
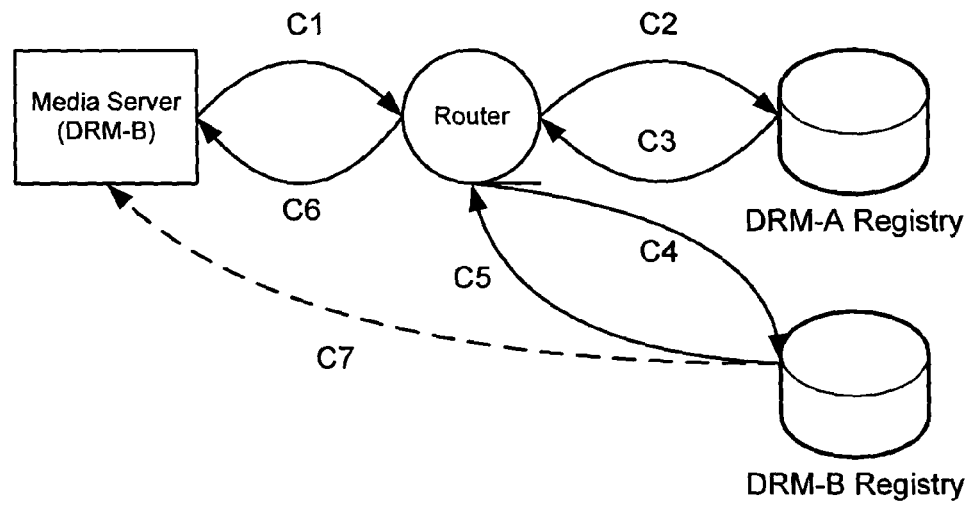

With reference to FIG. 22c, a Media Server communicates a DWM Content ID and DRM system ID (DRM-B) to a router, e.g., a Rights Registry. This first communication is labeled "C1". In the registry, the DWM Content ID is associated with DRM system type A (DRM-A), which is not compatible with DRM-B. The router communicates the DWM Content ID and DRM system ID (DRM-B) to a registry associated with DRM-A. (An address or link for DRM-A is stored in the Rights Registry.) This second communication is labeled "C2". The DRM-A registry locates Usage Rights associated with the DWM Content ID, but is unwilling or unable to obtain, convert, create or provide Usage Rights in DRM-B format. Usage Rights in DRM-A format are communicated back to the router ("C3"). The router uses the DRM System ID (DRM-B) sent by the Media Server to identify an address associated with a DRM-B registry. The router communicates ("C4") the DRM-A Usage Rights to the DRM-B registry. The DRM-B registry is intelligent, meaning that it is able to obtain, create, convert or provide Usage Rights that are compatible with DRM-B, but that represent the DRM-A Usage Rights (e.g., DRM-A to DRM-B options 1 through 4 can be used). Compatible Usage Rights are sent ("C5") from DRM-B registry back to the router for communication ("C6") to the Media Server. As an alternative communications path ("C7") the DRM-B registry communicates the DRM-B formatted Usage Rights directly to the Media Server. (The router, in the C7 case, communicates an address associated with the Media Server to DRM-B.)

Figure 22D:
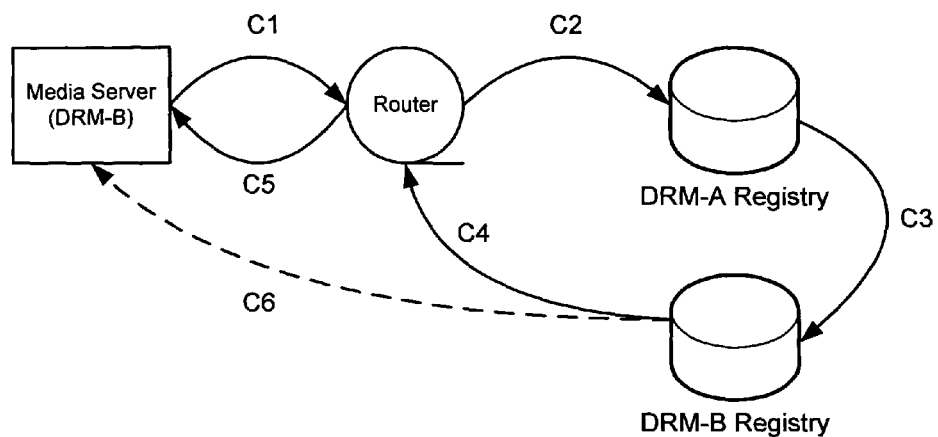

With reference to FIG. 22d, a Media Server communicates a DWM Content ID and DRM system ID (DRM-B) to a router, e.g., a Rights Registry. This first communication is labeled "C1". In the registry, the DWM Content ID is associated with DRM system type A (DRM-A), which is not compatible with DRM-B. The router communicates ("C2") the DWM Content ID and DRM system ID (DRM-B) to a registry associated with DRM-A. (An address or link for DRM-A is stored in the Rights Registry.) The DRM-A registry locates Usage Rights associated with the DWM Content ID, but is unwilling or unable to obtain, convert, create or provide. Usage Rights in DRM-B format. Usage Rights in DRM-A format (along with routing information) are communicated from the DRM-A registry to a DRM-B registry ("C3"). The DRM-B registry is intelligent, meaning that it is able to obtain, create, convert or provide Usage Rights that are compatible with DRM-B, but that represent the DRM-A Usage Rights (e.g. DRM-A to DRM-B options 1 through 4 can be used as discussed above). Compatible Usage Rights are sent ("C4") from DRM-B registry back to the router for communication ("C5") to the Media Server. As an alternative communications path ("C6") the DRM-B registry communicates the DRM-B formatted Usage Rights directly to the Media Server As a further alternative, the router and DRM-A registry can be merged or maintained by the same entity. Moreover, we prefer that the communication between router, DRM-A and DRM-B is seamless to a user of the Media Server. Also, instead of communicating Usage Rights between, e.g., DRM-A registry and DRM-B registry (e.g., FIGS. 22c-d), one or more codes are transmitted instead. The codes are universally recognized or at least recognized between the two registries as representing certain uses or restricted uses. For example, code 3 represents copy never, and code 5 represents that a transfer is allowed for to three different computing devices, etc. (e.g., DRM-A to DRM-B option 2, discussed above).

In a fourth scenario, and upon encountering an incompatibility, new DRM packaged content is downloaded to replace the raw content. A digital watermark detector residing on a Media Server (or the Media Server itself) communicates information to indicate which type of DRM system resides on the Media Server. This DRM system information can be set, e.g., in an accessible memory for DRM system identification. This information is used by a Rights Registry to select appropriately DRM-packaged content. (The Rights Directory can redirect the Media Server to, e.g., an on-line Music store where new content is downloaded, as described above.).

Expected Modifications

While we have focused primarily on digital watermarking to provide a Content ID, we expect that so-called "fingerprinting" can be used as an alternative in some situations. A fingerprint (e.g., a hash, derived signature or reduce-bit representation of content) is generated during content creation. This fingerprint is stored in a Fingerprint Rights Registry, along with corresponding Usage Rights. A Media Server includes a fingerprint reader, instead of or in addition to, a digital watermark detector. The fingerprint reader calculates or derives a fingerprint of content, which is used as a Fingerprint Content ID. A Fingerprint Content ID is communicated to the Fingerprint Rights Registry to obtain corresponding Usage Rights.

A combination of watermarking and fingerprinting can be used. For example, a Media Server searches content for expected digital watermarking (e.g., DWM Content ID), and if none is found, generates a content fingerprint to be used as a Fingerprint Content ID.

Fingerprinting can also be used to uniquely identify versions of songs. Consider a song, Song A. A first version (v1) of Song A is sent to Chuck. A fingerprint (f1) is derived from the first version (v1) prior to distributing to Chuck. The fingerprint (f1) is stored in a Rights Registry as the content identifier for Chuck's version. A second version (v2) of Song A is sent to Shelia. The second version (v2) varies slightly from the first version (v1). The variations are small, preferably imperceptible to a human listener. The variations, however, lead to a second, different fingerprint (f2). (The same fingerprinting module is used to generate fingerprints f1 and f2.) The fingerprint (f2) is stored in a Rights Registry as the content identifier for Shelia's version. The variations can be introduced through, e.g., a random or pseudo-random filter of Song A. Song A is filtered prior to each distribution. This allows fingerprinting to uniquely identify different distribution copies of a song.

Figure 23:
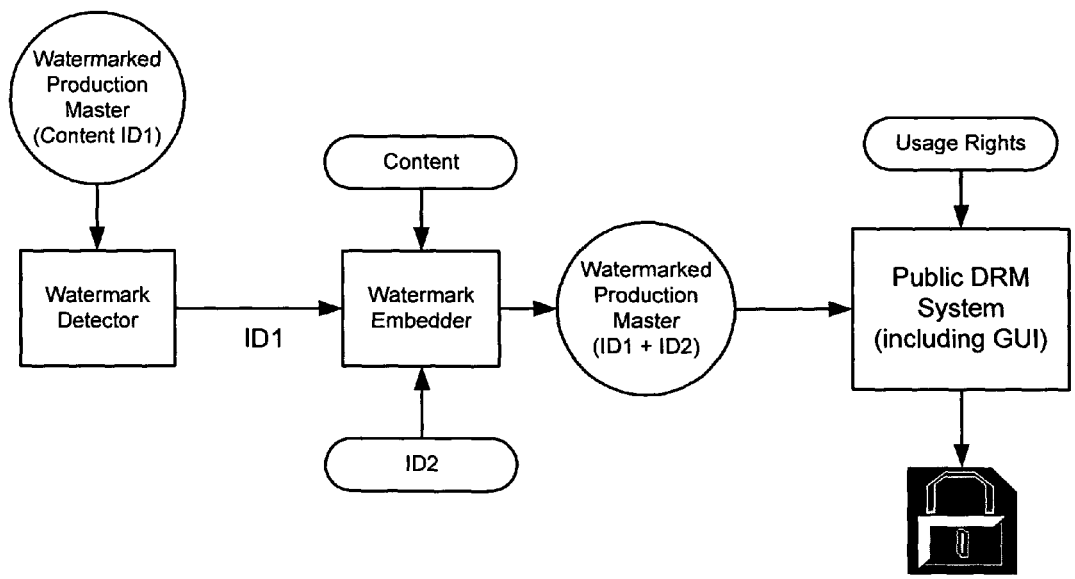
FIG. 23 illustrates a transmarking example, where a watermark from a production master is decoded and another watermark is added to content prior to DRM-packaging.

Another expected variation utilizes assignee's "transmarking" technology, e.g., as discussed in published U.S. patent application No. US 2001-0044899 A1, which is hereby incorporated by reference. With reference to FIG. 23, a watermarked master is received by an online distributor or content store. The watermarked master includes a DWM Content Identifier (ID1). The content store includes a digital watermark reader to read the watermark from the content and extracts the DWM Content ID (ID1). The DWM Content ID (ID1) is provided to a watermark embedder, along with the production master ("content" in FIG. 23) and additional watermark information (ID2). This information is used by the watermark embedder to create a watermarked production master including ID1 and ID2. The newly watermarked production master is provided for DRM-packaging. The new watermark information ID2 may also include additional information, e.g., to identify the online distributor or content store, etc. The new watermarking may also be formatted to better survive a particular encryption or compression that is associated with DRM-packaging. The new watermark may also include or link to transaction information, e.g., that uniquely identifies a user, Media Server or transaction details. In some case the digital watermark reader removes the watermark (ID1) and presents the resulting content for embedding by the watermark embedder. Reversible watermarking techniques are discussed, e.g., in assignee's published U.S. patent document Nos. US 2003-0179900 A1 and US 2003-0149879 A1, which are each hereby incorporated by reference.

(Alternatively, header or footer (e.g., ID3 tags) data is used rather than a digital watermark or fingerprint. Although not as robust to transformation as a digital watermark, header data can exist in content when a DRM system is hacked, but the content format is not changed. All told, however, we would prefer a digital watermark for its persistence and robustness.).

In some cases a Media Player will encounter raw content that has been ripped from a CD and did not pass through a DRM packaging route. This content may already have a DWM Content ID, or a DWM Content ID can be embedded during the ripping process based upon identifying the content via the CD or other means. In addition, a secondary digital watermark can be inserted in resulting raw content during ripping that carries a message indicating that playing is acceptable. As an alternative to a second digital watermark, a log is created on a Media Server that keeps track of content that has been checked and that has no DWM Content ID has been found, or content that is properly ripped. The second digital watermark (or DWM Content ID if created during the ripping stage as discussed above) may also include a Media Server identifier, which is used to ensure that the content stays within an expected Consumer Environment. If the watermarked content is found in a domain that does not match the Media Server identifier, the content can be regulated accordingly.

In still other implementations a digital watermark carries a DWM Content ID and one or more DRM system indicators. The DRM system indicators help to quickly identify an originating DRM system, e.g., helpful if using option b discussed above. A digital watermark can also carry information regarding content version ID, which may have significance depending on associated Usage Rights (e.g., copy once, copy never, etc.).

In yet another alternative implementation, a DRM system includes only "default" Usage Rights and a DWM Rights Registry is modeled after option a or b, discussed above. For option a, default Usage Rights are stated in a DWM Rights Registry. For option b, a DRM system is identified and default Usage Rights are stored for that DRM system for all content in a simplified DRM Rights Registry. Default Usage Rights can be update or changed overtime to reflect new rights or permitted uses. Aspects of our invention work as described above but with these modifications.

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporate by reference each of the U.S. Patent documents mentioned above.

The various section headings in this document are provided for the reader's convenience and provide no substantive limitations. Of course, the subject matter under one section can be readily combined with the subject matter under another section.

The methods, processes, and systems described above may be implemented in hardware, software or a combination of hardware and software. For example, the watermark data encoding processes may be implemented in a programmable computer or a special purpose digital circuit. Similarly, watermark data decoding may be implemented in software, firmware, hardware, or combinations of software, firmware and hardware. The methods and processes described above may be implemented in programs executed from a system's memory (a computer readable medium, such as an electronic, optical or magnetic storage device). A content owner and content ID can be combined into one content ID which is desirable in situations, such as for audio and video content, where content owners, such as record labels and movie studios, are sold and traded between content groups.

Some of the implementation have been described with respect to a "public" DRM system. It should be recognized that the functionality of the private DRM system and be divide or distributed between two or more DRM systems. It also should be appreciated that functionality of a "private" DRM system can be merged with that of a "public" DRM system, and vice versa.

The particular combinations of elements and features in the above-detailed embodiments are exemplary only; the interchanging and substitution of these teachings with other teachings in this and the incorporated-by-reference US patent documents are also contemplated.

What is claimed is:

1. A method comprising:
    initiating a search of raw content, using an electronic processor, for a content identifier steganographically embedded in data representing audio content or in data representing video content, wherein the content identifier steganographically embedded in the data signifies that the raw content was previously subject to digital rights management (DRM);
    finding the content identifier in the raw content;
    sending the content identifier to an online content store, wherein the online content store is remote to a media server;
    receiving from the online content store at least one option associated with the content identifier, wherein the at least one option comprises at least one option from a group of options comprising: purchase content associated with the content identifier subject to the DRM, purchase other content that is related to the raw content, and receive copyright information associated with the raw content; and sending a selected option to the online content store from the media server.

2. The method of claim 1 wherein the raw content is encountered during a survey of content stored on the media server.

3. A method comprising:
receiving, at an online content store, a content identifier from a user device, wherein the user device is remotely located from the online content store, wherein the content identifier has been steganographically embedded in raw data representing audio content or representing video content, wherein the presence of the content identifier in the raw data signifies that the raw data was at one time protected using digital rights management (DRM);
identifying, using the content identifier, one or more options associated with the content identifier;
providing from the online content store the one or more options associated with the content identifier to the user device;
receiving at the online content store a selection of an option from among the one or more options associated with the content identifier from the user device, wherein the at least one option comprises at least one option from a group of options comprising: an option to purchase content associated with the content identifier protected using the DRM, an option to purchase other content that is related to the raw data, and an option to receive copyright information associated with the raw data; and
carrying out the selected option at the online content store.

4. A non-transitory computer readable media having instructions stored thereon that, when executed by a computing device, cause the computing device to perform operations comprising:
receiving a content identifier from a user device, wherein the content identifier has been steganographically embedded in raw data representing audio content or representing video content, and wherein the presence of the content identifier in the raw data signifies that the raw data was previously protected using digital rights management (DRM);
identifying, using the content identifier, one or more options associated with the content identifier;
providing the one or more options associated with the content identifier to the user device;
receiving a selection of an option from among the one or more options associated with the content identifier from the user device, wherein the at least one option comprises at least one option from a group of options comprising: an option to purchase DRM protected content associated with the content identifier, an option to purchase other content that is related to the raw data, and an option to receive copyright information associated with the raw data; and
carrying out the selected option.

5. A method comprising:
receiving a content identifier that identifies content, wherein the content identifier is derived from first content;
receiving a forensic identifier, wherein the forensic identifier has been steganographically embedded in the first content;
determining a first promotional opportunity associated with the content identifier using an electronic processor, wherein the first promotional opportunity comprises an opportunity to purchase second content, and wherein the second content is related to the first content;
providing information regarding the first promotional opportunity;
receiving the forensic identifier a second time;
determining a second, different promotional opportunity associated with the content identifier based at least in part on receiving the forensic identifier a second time; and
providing information regarding the second, different promotional opportunity.

6. The method of claim 5, wherein the content identifier is derived from the first content using fingerprinting.

7. The method of claim 5, wherein the content identifier is steganographically decoded from alterations to data representing picture portions of a video portion or from data representing audible portions of an audio portion of the first content.

8. The method of claim 5, wherein the information regarding the first promotional opportunity or the second, different promotional opportunity is provided to a remote device.

9. The method of claim 5, wherein the information regarding the first promotional opportunity is provided to two or more user devices in response to a first instance of the content identifier being received.

10. A non-transitory computer readable media having instructions stored thereon that, when executed by a computing device, cause the computing device to perform operations comprising:
receiving a content identifier that identifies content, wherein the content identifier is derived from first content;
receiving a forensic identifier, wherein the forensic identifier has been steganographically embedded in the first content;
determining a first promotional opportunity associated with the content identifier, wherein the first promotional opportunity comprises an opportunity to purchase second content, and wherein the second content is different than the first content;
sending information regarding the first promotional opportunity;
receiving the forensic identifier a second time;
determining a second, different promotional opportunity associated with the content identifier; and
sending information regarding the second, different promotional opportunity.

11. An apparatus comprising:
a memory configured to:
store in electronic memory identifying data derived from data representing picture portions of a video signal or derived from data representing audible portions of an audio signal, wherein the identifying data has been received over a network from a remotely located user; and
store a forensic identifier, wherein forensic identifier has been steganographically embedded in the video signal or the audio signal; and
an electronic processor configured to:
monitor the number of times the forensic identifier has been received;
with reference to a computerized database or computerized repository, determine a promotional opportunity associated with the identifying data and the forensic identifier based at least in part on the number of times the forensic identifier has been received; and
provide information regarding the promotional opportunity;

wherein the promotional opportunity comprises an opportunity to purchase second content, and wherein the second content is related to the first content.

12. The apparatus of claim 11, wherein the identifying data was derived using fingerprinting.

13. The apparatus of claim 11, wherein the identifying data was derived using digital watermark decoding.

14. The apparatus of claim 11, wherein the information regarding the promotional opportunity is provided to two or more users.

15. The method of claim 1, further comprising receiving a DRM protected version of the unencrypted content.

16. The method of claim 3, wherein the action comprises sending a DRM protected version of the unencrypted data.

17. The non-transitory computer readable media of claim 4, wherein the action comprises sending a DRM protected version of the unencrypted data.

* * * * *

UNITED STATES PATENT AND TRADEMARK OFFICE
CERTIFICATE OF CORRECTION

PATENT NO. : 8,055,899 B2
APPLICATION NO. : 11/208441
DATED : November 8, 2011
INVENTOR(S) : Levy et al.

It is certified that error appears in the above-identified patent and that said Letters Patent is hereby corrected as shown below:

Title Page 4, item (56), under "Other Publications", in Column 1, Line 41, delete "originall" and insert -- originally --.

Title Page 4, item (56), under "Other Publications", in Column 2, Line 17, delete "Unenerypted" and insert -- Unencrypted --.

Title Page 4, item (56), under "Other Publications", in Column 2, Lines 35-36, delete "Koch et al., "Copyright Protection for Multimedia Data," Dec. 1994, pp. 1-15." and insert -- Koch et al., "Copyright Protection for Multimedia Data," Dec. 1994, pp. 1-15. http://www.digimarc.com/media/release.asp?home=news&newsID=521, Nov. 20, 2006. --.

Title Page 4, item (56), under "Other Publications", in Column 2, Line 45, delete "COpyright" and insert -- Copyright --.

Title Page 4, item (56), under "Other Publications", in Column 2, Line 48, delete "COpyright" and insert -- Copyright --.

Title Page 4, item (56), under "Other Publications", in Column 2, Line 50, delete "Control" and insert -- Control and --.

Title Page 4, item (56), under "Other Publications", in Column 2, Line 50, delete "COpyright" and insert -- Copyright --.

Column 29, line 6, in Claim 2, delete "claim 1" and insert -- claim 1, --.

Signed and Sealed this
Twenty-ninth Day of May, 2012

David J. Kappos
*Director of the United States Patent and Trademark Office*